United States Patent
Ott et al.

(10) Patent No.: US 12,299,358 B2
(45) Date of Patent: May 13, 2025

(54) ADDITIVE MANUFACTURING SIMULATIONS

(71) Applicant: General Electric Company, Schenectady, NY (US)

(72) Inventors: Eric Allen Ott, Cincinnati, OH (US); Johannes Stroessner, Schwarzenbach an der Saale (DE); Manuel Acosta, Blue Ash, OH (US); Peter Appel, Bamberg (DE); Hongqing Sun, Belmont, MA (US)

(73) Assignees: General Electric Company, Evendale, OH (US); Concept Laser GmbH, Lichtenfels (DE)

( * ) Notice: Subject to any disclaimer, the term of this patent is extended or adjusted under 35 U.S.C. 154(b) by 789 days.

(21) Appl. No.: 17/197,767

(22) Filed: Mar. 10, 2021

(65) Prior Publication Data

US 2022/0291661 A1 Sep. 15, 2022

(51) Int. Cl.
*G06F 30/20* (2020.01)
*B22F 10/38* (2021.01)
(Continued)

(52) U.S. Cl.
CPC .............. *G06F 30/20* (2020.01); *B22F 10/38* (2021.01); *B22F 10/80* (2021.01); *B29C 64/393* (2017.08);
(Continued)

(58) Field of Classification Search
CPC .. G06F 30/20; G06F 2111/08; G06F 2113/10; G06F 30/17; G06F 30/25;
(Continued)

(56) References Cited

U.S. PATENT DOCUMENTS

| | | |
|---|---|---|
| 6,122,564 A | 9/2000 | Koch et al. |
| 6,925,346 B1 | 8/2005 | Mazumder et al. |

(Continued)

OTHER PUBLICATIONS

Ahn, Geometric Fitting of Parametric Curves and Surfaces, Journal of Information Processing Systems, vol. 4, No. 4, Dec. 2008, pp. 153-158.

(Continued)

*Primary Examiner* — John E Johansen
(74) *Attorney, Agent, or Firm* — Dority & Manning, P.A.

(57) ABSTRACT

Methods of simulating additively manufacturing an object may include generating a simulated additively manufactured object based at least in part on a plurality of approximate consolidation domains that respectively correspond to a plurality of consolidation tracks determined from one or more digital representations of an additively manufactured object, and determining a predictive inference with respect to one or more material properties of the object to be additively manufactured based at least in part on the simulated additively manufactured object. Methods may include generating, for an object to be additively manufactured, a CAD file and/or a build file based at least in part on a simulated additively manufactured object and/or based at least in part on one or more predictive inferences with respect to one or more material properties of the object to be additively manufactured. An object may be additively manufactured based at least in part on a simulated additively manufactured object and/or a CAD file and/or the build file corresponding thereto.

16 Claims, 18 Drawing Sheets

(51) Int. Cl.

| | |
|---|---|
| *B22F 10/80* | (2021.01) |
| *B29C 64/393* | (2017.01) |
| *B33Y 10/00* | (2015.01) |
| *B33Y 50/02* | (2015.01) |
| *G06F 30/17* | (2020.01) |
| *G06F 30/25* | (2020.01) |
| *G06F 113/10* | (2020.01) |
| *B22F 10/28* | (2021.01) |
| *B29C 64/153* | (2017.01) |
| *G06F 111/08* | (2020.01) |
| *G06F 119/18* | (2020.01) |

(52) U.S. Cl.
CPC .............. *B33Y 10/00* (2014.12); *B33Y 50/02* (2014.12); *G06F 30/17* (2020.01); *G06F 30/25* (2020.01); *B22F 10/28* (2021.01); *B29C 64/153* (2017.08); *G06F 2111/08* (2020.01); *G06F 2113/10* (2020.01); *G06F 2119/18* (2020.01)

(58) Field of Classification Search
CPC ..... G06F 2119/18; B33Y 10/00; B33Y 50/02; G05B 19/4099; B22F 10/38; B22F 10/80; B22F 10/28; B29C 64/393; B29C 64/153
USPC .......................................................... 703/6
See application file for complete search history.

(56) References Cited

U.S. PATENT DOCUMENTS

| | | | |
|---|---|---|---|
| 10,112,262 B2 | 10/2018 | Cheverton et al. | |
| 10,406,633 B2* | 9/2019 | Crear ................... | B23K 26/082 |
| 10,406,760 B2 | 9/2019 | Shuck et al. | |
| 2015/0048064 A1 | 2/2015 | Cheverton et al. | |
| 2019/0091935 A1 | 3/2019 | Weichselbaumer et al. | |
| 2019/0188346 A1* | 6/2019 | Mirabella ............... | B22F 10/80 |
| 2019/0248078 A1 | 8/2019 | Domrose et al. | |
| 2020/0307174 A1* | 10/2020 | Woytowitz ............ | B29C 64/393 |

OTHER PUBLICATIONS

Bassoli et al., Development of Laser-Based Bed Fusion Process Parameters and Scanning Strategy for New Metal Alloy Grades: A Holistic Method Formulation, Materials (Basel), vol. 11, Issue 12, 2018, 23 Pages.

Clymer et al., Power-Velocity Process Design Charts for Powder Bed Additive Manufacturing, Journal of Mechanical Design, Oct. 2017, vol. 139, pp. 100907-1 to 100907-7.

Louthan, Jr., Optical Metallography, ASM Handbook, vol. 10 Materials Characterizations, R.E. Whan, 1986, pp. 299-308.

Mukherjee et al., Mitigation of lack of fusion defects in powder bed additive manufacturing, Journal of Manufacturing Processes, vol. 36, Oct. 2018, pp. 442-449.

Nunes, Jr., An Extended Rosenthal Weld Model, Welding Research Supplement, Jun. 1983, pp. 165s-170s.

Pinkerton et al., Modelling the geometry of a moving laser melt pool and deposition track via energy and mass balances, Journal of Physics D: Applied Physics, vol. 37, No. 14, 2004, 1885. (Abstract Only).

Shape Similarity, Algorithms, Jun. 1997, 3 Pages. Retrieved from: https://www8.cs.umu.se/kurser/TDBAD/VT06/algorithms/BOOK/BOOKS/NODE196.HTM.

Smith et al., Least squares best-fit geometric elements taking into account uncertainty structure, 16th International Congress of Metrology, 06004, EDP Sciences, 2013, 5 Pages. Article available at http://cfmetrologie.edpsciences.org or http://dx.doi.org/10.1051/metrology/201306004.

Sundar et al., Skeleton Based Shape Matching and Retrieval, IEEE, 2003 Shape Modeling International, Seoul, South Korea, May 12-15, 2003, 10 Pages.

Teng et al., Simulating Melt Pool Shape and Lack of Fusion Porosity for Selective Laser Melting of Cobalt Chromium Components, Journal of Manufacturing Science and Engineering, vol. 139, Jan. 2017, 12 Pages.

Veltkamp, Shape matching: Similarity measures and algorithms, UU-CS-2001-03, Research Gate, IEEE, Jan. 2001, 18 Pages. https://www.researchgate.net/publication/3896728.

* cited by examiner

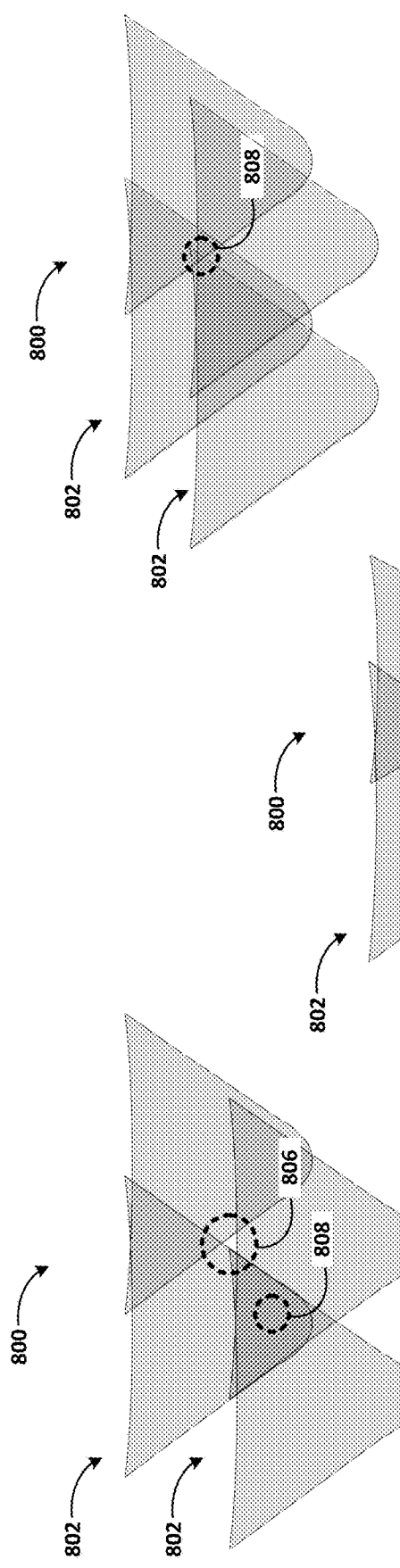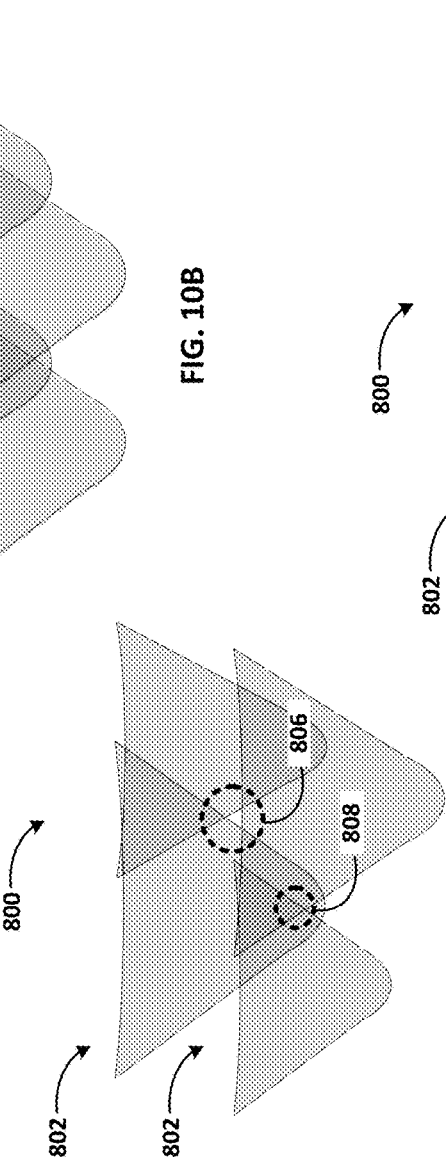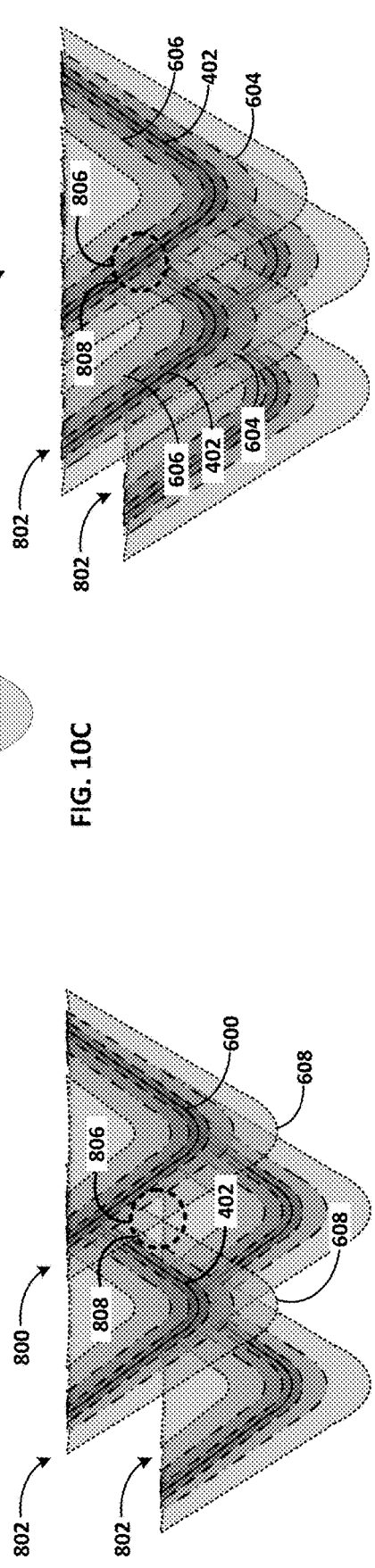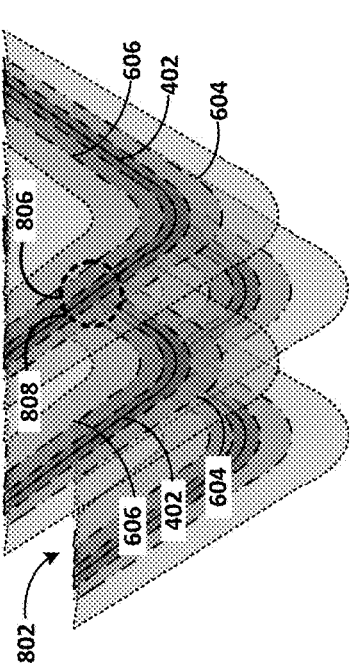

ADDITIVE MANUFACTURING SIMULATIONS

FIELD

The present disclosure generally pertains to systems and methods for additively manufacturing of three dimensional objects, as well as systems and methods for designing three-dimensional objects to be additively manufactured.

BACKGROUND

Additive manufacturing technology may be utilized to manufacture three dimensional objects. An object that is intended to be additively manufactured must first be designed before the object can be additively manufactured. Design processes that yield three-dimensional objects meeting quality and or productivity parameters can be complex and time consuming.

Accordingly, there exists a need for improved systems and methods of additively manufacturing three-dimensional objects, including improved systems and methods of designing three-dimensional objects to be additively manufactured.

BRIEF DESCRIPTION

Aspects and advantages will be set forth in part in the following description, or may be apparent from the description, or may be learned through practicing the presently disclosed subject matter.

In one aspect, the present disclosure embraces methods of simulating additively manufacturing a three-dimensional object. An exemplary method may include generating a simulated additively manufactured three-dimensional object based at least in part on a plurality of approximate consolidation domains. The plurality of approximate consolidation domains may respectively correspond to a plurality of consolidation tracks determined from one or more digital representations of an additively manufactured three-dimensional object. An exemplary method may additionally or alternatively include determining a predictive inference with respect to one or more material properties of a three-dimensional object to be additively manufactured based at least in part on the simulated additively manufactured three-dimensional object.

In another aspect, the present disclosure embraces methods of designing an additively-manufactured three-dimensional object. An exemplary method may include generating a CAD file and/or a build file for a three-dimensional object to be additively manufactured. The CAD file and/or the build file may be generated based at least in part on a simulated additively manufactured three-dimensional object and/or based at least in part on one or more predictive inferences with respect to one or more material properties of the three-dimensional object to be additively manufactured. The three-dimensional object may be additively manufactured based at least in part on the CAD file and/or the build file.

In yet another aspect, the present disclosure embraces methods of additively manufacturing a three-dimensional object. An exemplary method may include generating a simulated additively manufactured three-dimensional object based at least in part on a plurality of approximate consolidation domains. The plurality of approximate consolidation domains may respectively correspond to a plurality of consolidation tracks determined from one or more digital representations of an additively manufactured three-dimensional object. The three-dimensional object may be additively manufactured based at least in part on the simulated additively manufactured three-dimensional object.

In still another aspect, the present disclosure embraces computer-readable media. Exemplary computer-readable medium may include computer-executable instructions, which when executed by a processor, cause the processor to perform a method in accordance with the present disclosure, including, for example, a method of simulating additively manufacturing a three-dimensional object, a method of designing an additively-manufactured three-dimensional object, and/or a method of additively manufacturing a three-dimensional object.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 10A-10E schematically depict further exemplary configurations and arrangements of approximate consolidation domains for an additive manufacturing simulation;

Figure 1:
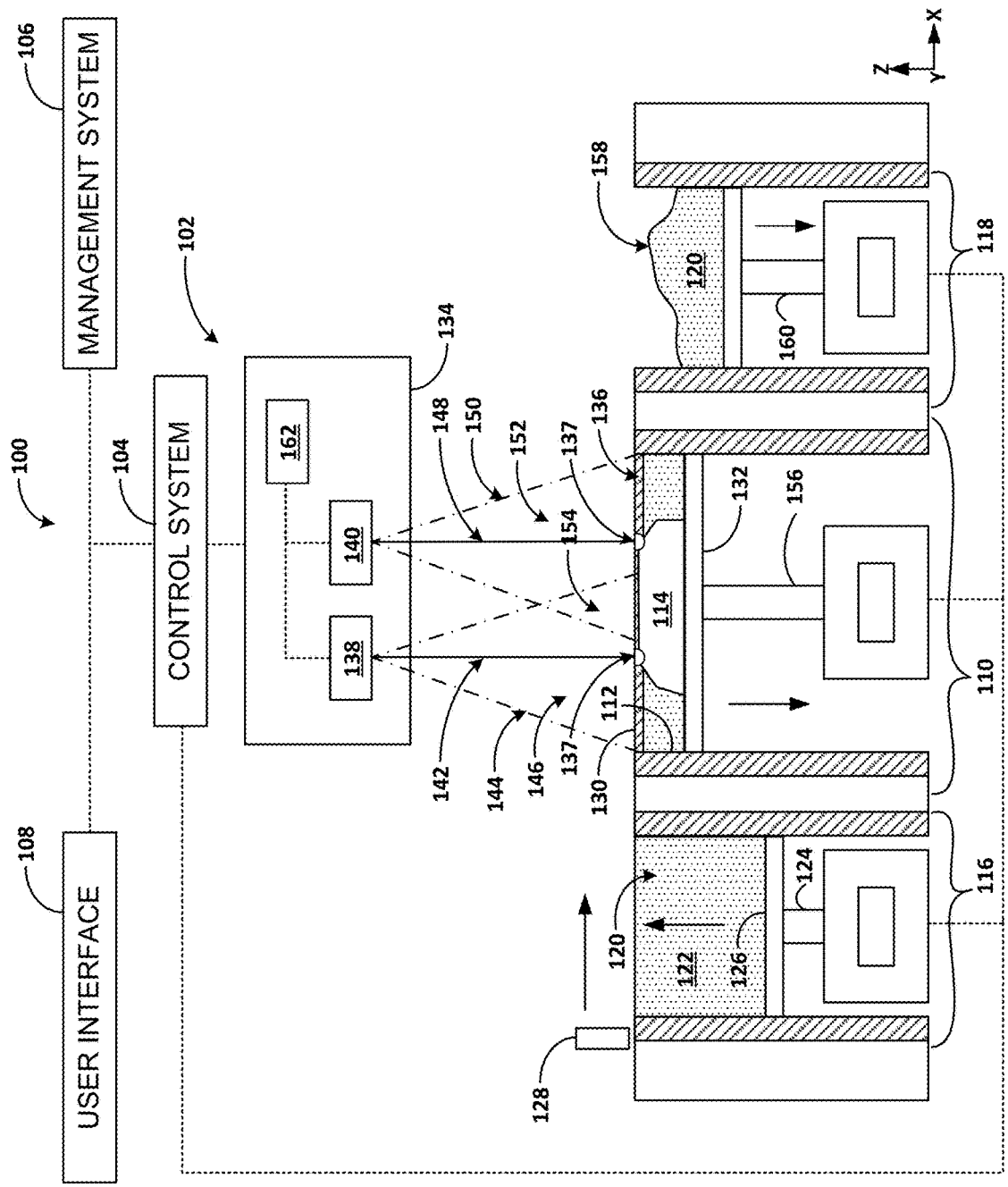
FIG. 1 schematically depicts an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The presently disclosed subject matter pertains to additive manufacturing machines and/or related methods. As used herein, the term "additive manufacturing" refers generally to manufacturing technology in which components are manufactured in a layer-by-layer manner. An exemplary additive manufacturing machine may be configured to utilize any desired additive manufacturing technology. In an exemplary embodiment, the additive manufacturing machine may utilize an additive manufacturing technology that includes a powder bed technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary powder bed technology, thin layers of build material, such as powder material, are sequentially applied to a build plane and then selectively melted, fused, and/or sintered to one another in a layer-by-layer manner to form one or more three-dimensional objects. Additively manufactured objects are generally monolithic in nature, and may have a variety of integral sub-components.

Additionally or alternatively suitable additive manufacturing technologies include, for example, Binder Jet technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Sterolithography (SLA) technology, and other additive manufacturing technology that utilizes an energy beam.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced in connection or in combination with any additive manufacturing technology, including in connection or in combination with other manufacturing technology, such as layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 μm and 200 μm, although the thickness may be selected based on any number of parameters and may be any suitable size according to alternative embodiments.

The present disclosure generally provides methods of simulating additively manufacturing a three-dimensional object. The simulation may utilize statistical inference to determine a plurality of approximate consolidation domains corresponding to consolidation tracks in an additively manufactured three-dimensional object formed by an energy beam when selectively irradiating regions of a build material. As used herein, the term "consolidation domain" refers to a domain of an additively manufactured three-dimensional object being subjected to consolidation by an energy beam at a given point along a consolidation track. The consolidation domain may be defined by a consolidation boundary. In some embodiments a consolidation domain may refer to a melt pool domain caused by the energy beam at the given point along the consolidation track, for example, in the case of a powder bed technology in which the energy beam melts build material such as with a DMLM process or an EBM process. The melt pool domain may be defined by a melt pool boundary corresponding to a transition from material that becomes molten to material that remains unmolten by the energy beam at the given point along the consolidation track. Additionally, or in the alternative, a consolidation domain may refer to a sintering domain caused by the energy beam at the given point along the consolidation track, for example, in the case of a powder bed technology in which the energy beam sinters build material, for example, generally without melting the build material such as with an EBS process, a DMLS process, or an SLS process. The sintering domain may be defined by a sintering boundary corresponding to a transition from material that becomes sintered to material that remains unsintered by the energy beam at the given point along the consolidation track. In yet another embodiment, a consolidation domain may refer to a reaction domain caused by the energy beam at the given point along the consolidation track, for example, in the case of a Binder Jet process in which an energy beam causes a liquid binder material to undergo a reaction that solidifies adjacent binder material. The reaction domain may be defined by a reaction boundary corresponding to a transition from material that undergoes reaction to material that remains unreacted by the energy beam at the given point along the consolidation track. As used herein, the term "consolidation track" refers to a path along which a focal point of an energy beam propagates when selectively irradiating and thereby densifying regions of a build material.

Predictive inferences about one or more material properties of an object to be additively manufactured may be determined based at least in part on the simulation. For example, the simulation may include generating a simulated additively manufactured three-dimensional object, and predictive inferences about an object to be actually additively manufactured may be determined based at least in part on the simulated additively manufactured three dimensional object. CAD files and/or build files for an object to be additively manufactured may be generated based at least in part on the simulation and/or the predictive inferences. One or more three-dimensional objects may be additively manufactured based at least in part on the simulation and/or the predictive inferences, for example, using such CAD files and/or build files. Additionally, or in the alternative, one or more predictive inferences about material properties may be produced after additively manufacturing a three dimensional object, for example, by simulating one or more material properties and producing one or more predictive inferences about the three dimensional object and/or the material thereof.

Advantageously, the present disclosure may allow for additive manufacturing simulations that allow predictive inferences to be determined about three-dimensional objects without having to additively manufacture the three-dimensional objects. Improved object design process may be realized, including shortened lead times for designing three-dimensional objects and/or improved designs for three-dimensional objects. Additionally, or in the alternative, improved three-dimensional objects and/or improved additive manufacturing processes may be realized, including improved capabilities with respect to quality parameters and/or productivity parameters.

As used herein, the term "statistical inference" refers to using data analysis to deduce deterministic and/or probabilistic properties of one or more three-dimensional objects, including with respect to one or more material properties thereof. By way of example, a statistical inference may include a deterministic property such as a maximum, minimum, and/or range for a value of a material property of a three-dimensional object. Additionally, or in the alternative, a statistical inference may include a probabilistic property of such as a probability distribution for a value of a material property of a three-dimensional object.

As used herein, the term "predictive inference" refers to a statistical inference that pertains to the prediction of future observations based on past observations. By way of example, a predictive inference may include a deterministic property such as a maximum, minimum, and/or range for a value of a material property of a three-dimensional object. Additionally, or in the alternative, a predictive inference may include a probabilistic property of such as a probability distribution for a value of a material property of a three-dimensional object.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing build material, such as powder material, across a build module, a build plate that supports the powder bed generally defines the build plane. For processes that to not utilize a powder bed, the term "build plane" may refer to a surface plane upon which further additive deposition may be carried out when additively manufacturing a three-dimensional object.

Exemplary embodiments of the present disclosure will now be described in further detail. By way of example, FIG. 1 schematically depicts an exemplary additive manufacturing system 100 that utilizes a powder bed technology. The example provided with reference to FIG. 1 is provided by way of example only and is not intended to be limiting. Other embodiments that utilize a powder bed technology are also contemplated, as are other additive manufacturing technologies, all of which are within the scope of the present disclosure. As shown in FIG. 1, the additive manufacturing system 100 may include one or more additive manufacturing machines 102. The one or more additive manufacturing machines 102 may include a control system 104. The control system may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. In some embodiments, an additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130.

The additive manufacturing machine 102 includes an energy beam system 134 configured to generate one or more energy beams, and to direct the respective energy beams onto the build plane 130 to selectively solidify respective portions of the powder bed 136 defining the build plane 130. The one or more energy beams may be a laser beam, an electron beam, a plasma beam, an electrical energy beam, an infrared beam, and so forth, as applicable to the respective additive manufacturing technology that may be utilized in a given embodiment. The one or more energy beams may respectively generate a consolidation domain 137 made up of at least partially molten powder material 120 as the energy beam passes across the powder bed 136. In some embodiments, the consolidation domain 137 may be or may include a melt pool domain, such as in the case of a DMLM process or an EBM process. Additionally, or in the alternative, the consolidation domain 137 may be or include a sintering domain, such as in the case of an EBS process, a DMLS process, or an SLS process. In yet another embodiment, the consolidation domain 137 may be or include a reaction domain, such as in the case of a Binder Jet process. Referring to the exemplary embodiment shown in FIG. 1, the one or more energy beams may move across the powder bed 136 according to a scan path defined by the control system 104. As the consolidation domain 137 cools, the molten powder material solidifies to form a consolidation track in the powder bed 136. Sequential consolidation track become integrally melted and/or fused with previously or concurrently formed consolidation track, such as from the current or previous layers of the powder bed 136, to form the object 114.

As the respective energy beams selectively melt or fuse the sequential layers of powder material 120 that define the powder bed 136, the object 114 begins to take shape. Typically with a DMLM, EBM, or SLM system, the powder material 120 is fully melted, with respective layers being melted or re-melted with respective passes of the energy beams. Conversely, with DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices configured to generate a plurality of energy beams and to direct the energy beams upon the build plane 130. The irradiation devices may respectively have an energy beam source, a galvo-scanner, and optical componentry configured to direct the energy beam onto the build plane 130. For the embodiment shown in FIG. 1, the energy beam system 134 includes a first irradiation device 138 and a second irradiation device 140. In other embodiments, an energy beam system 134 may include three, four, six, eight, ten, or more irradiation devices. The plurality of irradiation devise may be configured to respectively generate one or more energy beams that are respectively scannable within a scan field incident upon at least a portion of the build plane 130. For example, the first irradiation device 138 may generate a first energy beam 142 that is scannable within a first scan field 144 incident upon at least a first build plane region 146. The second irradiation device 140 may generate a second energy beam 148 that is scannable within a second scan field 150 incident upon at least a second build plane region 152. The first scan field 144 and the second scan field 150 may overlap such that the first build plane region 146 scannable by the first energy beam 142 overlaps with the second build plane region 152 scannable by the second energy beam 148. The overlapping portion of the first build plane region 146 and the second build plane region 152 may sometimes be referred to as an interlace region 154. Portions of the powder bed 136 to be irradiated within the interlace region 154 may be irradiated by the first energy beam 142 and/or the second energy beam 148 in accordance with the present disclosure.

To irradiate a layer of the powder bed 136, the one or more irradiation devices (e.g., the first irradiation device 138 and the second irradiation device 140) respectively direct the plurality of energy beams (e.g., the first energy beam 142 and the second energy beam 148) across the respective portions of the build plane 130 (e.g., the first build plane region 146 and the second build plane region 152) to melt or fuse the portions of the powder material 120 that are to become part of the object 114. The first layer or series of layers of the powder bed 136 are typically melted or fused to the build platform 132, and then sequential layers of the powder bed 136 are melted or fused to one another to additively manufacture the object 114.

As sequential layers of the powder bed 136 are melted or fused to one another, a build piston 156 gradually lowers the build platform 132 to make room for the recoater 128 to distribute sequential layers of powder material 120. As the build piston 156 gradually lowers and sequential layers of powdered material 120 are applied across the build plane 130, the next sequential layer of powder material 120 defines the surface of the powder bed 136 coinciding with the build plane 130. Sequential layers of the powder bed 136 may be selectively melted or fused until a completed object 114 has been additively manufactured.

In some embodiments, an additive manufacturing machine may utilize an overflow module 118 to capture excess powder material 120 in an overflow chamber 158. The overflow module 118 may include an overflow piston 160 that gradually lowers to make room within the overflow chamber 158 for additional excess powder material 120.

It will be appreciated that in some embodiments an additive manufacturing machine may not utilize a powder module 116 and/or an overflow module 118, and that other systems may be provided for handling powder material 120, including different powder supply systems and/or excess powder recapture systems. However, the subject matter of the present disclosure may be practiced with any suitable additive manufacturing machine without departing from the scope hereof.

Still referring to FIG. 1, in some embodiments, an additive manufacturing machine 102 may include a monitoring system 162. The monitoring system 162 may be configured to detect a monitoring beam (not shown) such as an infrared beam from a laser diode and/or a reflected portion of an energy beam, and to determine one or more parameters associated with irradiating the sequential layers of the powder bed 136 based at least in part on the detected monitoring beam. The one or more parameters determined by the monitoring system 162 may be utilized, for example, by the control system 104, to control one or more operations of the additive manufacturing machine 102 and/or of the additive manufacturing system 100. The monitoring system 162 may be configured to project a monitoring beam (not shown) and to detect a portion of the monitoring beam reflected from the build plane 130. Additionally, and/or in the alternative, the monitoring system 162 may be configured to detect a monitoring beam that includes radiation emitted from the build plane, such as radiation from an energy beam reflected from the powder bed 136 and/or radiation emitted from a consolidation domain 137, such as a melt pool domain, in the powder bed 136 generated by an energy beam and/or radiation emitted from a portion of the powder bed 136 adjacent to the consolidation domain 137.

The monitoring system 162 may include componentry integrated as part of the additive manufacturing machine 102 and/or componentry that is provided separately from the additive manufacturing machine 102. For example, the monitoring system 162 may include componentry integrated as part of the energy beam system 134. Additionally, or in the alternative, the monitoring system 162 may include separate componentry, such as in the form of an assembly, that can be installed as part of the energy beam system 134 and/or as part of the additive manufacturing machine 102.

Figure 2:
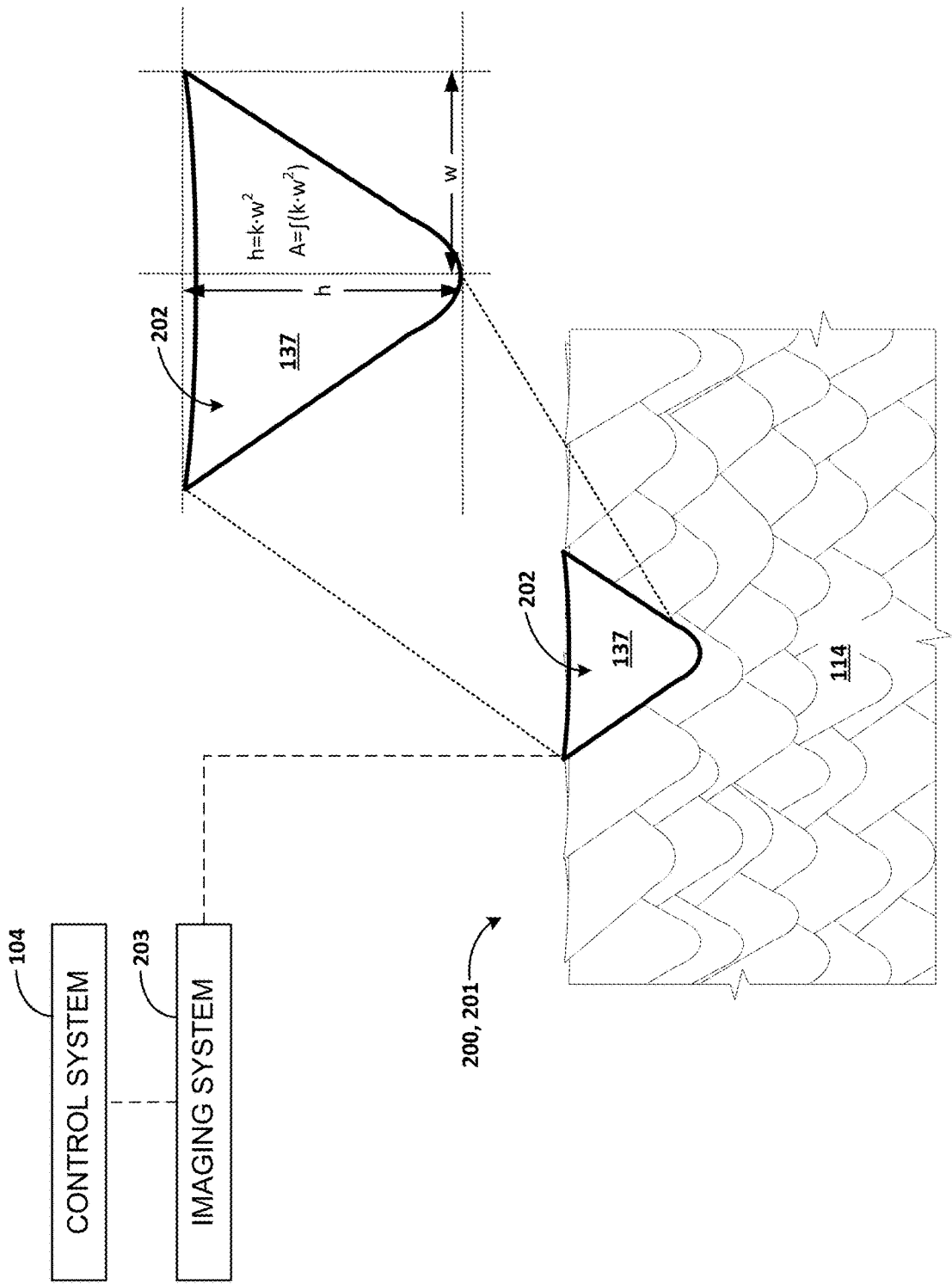
FIG. 2 schematically depicts an enlarged, cross-sectional view of an exemplary additively manufactured three-dimensional object.

Now turning to FIG. 2, a transverse cross-sectional view of an exemplary additively manufactured three-dimensional object 114 is shown. The cross-sectional view shown in FIG. 2 may depict a digital representation 200 of a three-dimensional object 114. The digital representation 200 of the three-dimensional object 114 may include image data and/or a rendered image from the image data. In some embodiments, the digital representation 200 may include or correspond to a micrographic image 201 of a three-dimensional object 114. The digital representation 200 of the three-dimensional object 114 may be obtained from a test specimen taken from a three-dimensional object 114, such as in the case of preparing a test specimen for micrographic image analysis. A digital representation 200, such as a micrographic image 201 may be obtained through any suitable imaging technology, including optical metallography technology, and/or electron micrograph technology. For example, a digital representation 200 such as a micrographic image 201, as depicted in FIG. 2, may be obtained using an imaging system 203, such as an imaging system 203 that includes scanning electron microscope technology, field emission scanning electron microscope technology, or the like. Test specimen prepared for optical metallography and/or electron micrography may be subjected to etching, anodizing, or other preparatory processes. The specific preparatory processes may be selected to provide a suitable specimen for the technology utilized. As shown in FIG. 2, a digital representation 200 of a cross-sectional view, such as a micrographic image 201, of an additively manufactured three-dimensional object 114 may reveal consolidation tracks 202 representing cross-sections of consolidation domains 137 formed by the respective consolidation domains 137 moving across the powder bed 136 when additively manufacturing the object 114. A respective consolidation track 202 may correspond to a boundary of the consolidation domain 137 at the location of the respective consolidation track 202. As shown in FIG. 2, the consolidation domains 137 corresponding to respective consolidation tracks 202 may overlap one another, as the one or more energy beams 142, 148 may follow consolidation tracks 202 configured and arranged to cause the respective consolidation domains 137 of a consolidation track 202 to overlap adjacent consolidation tracks 202. In some embodiments the one or more energy beams 142, 148 may reconsolidate at least a portion of an adjacent consolidation track 202. By way of example, in the case of a melt pool domain, the one or more energy beams 142, 148 may remelt adjacent consolidation tracks 202. Additionally, or in the alternative, the one or more energy beams 142, 148 may remelt a portion of one or more previous layers of the object 114 and/or of the powder bed 136, and/or one or more adjacent consolidation tracks 202 from such one or more previous layers.

In some embodiments, the consolidation tracks 202 and/or the consolidation domains 137 may be determined visually, for example, with a human eye, from a visual rendering of a digital representation 200, such as a micrographic image 201. Additionally, or in the alternative, the consolidation tracks 202 may be determined from a digital representation 200, such as a micrographic image 201, using a computer vision program that detects pixels based on one or more optically determinable properties such as brightness, color, consolidation track pattern, etc. Exemplary computer vision programs may utilize a contour tracing algorithm and/or a boundary tracing algorithm. The digital representation 200, such as a micrographic image 201, may be embodies as image data and/or in the form of a visually rendered image.

Figure 3A:
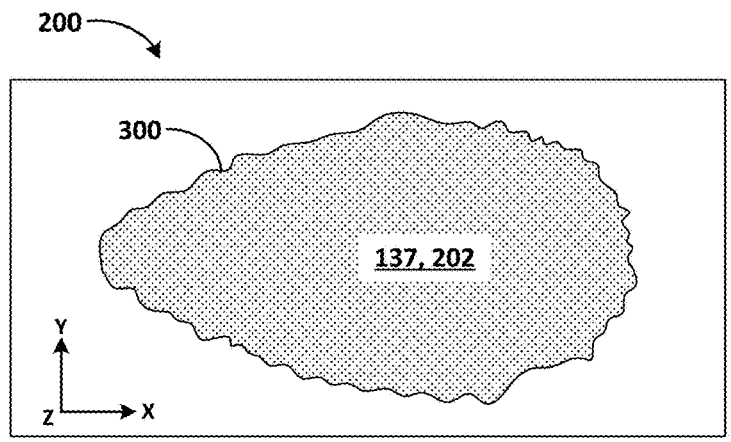
FIGS. 3A-3C schematically depict an exemplary top cross-sectional view, a longitudinal cross-sectional view, and a transverse cross-sectional view, of a respective consolidation tracks formed by an energy beam irradiating a bed of build material.
Figure 3B:
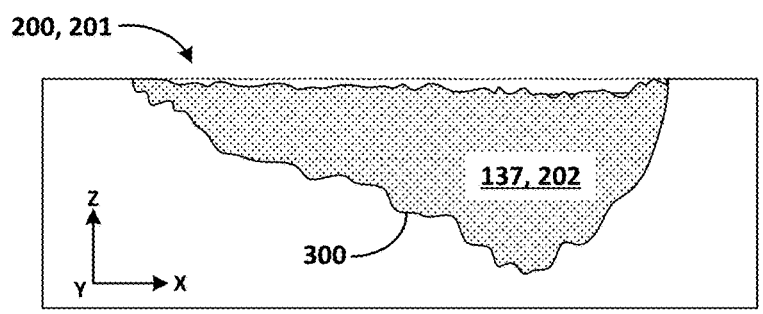
Figure 3C:
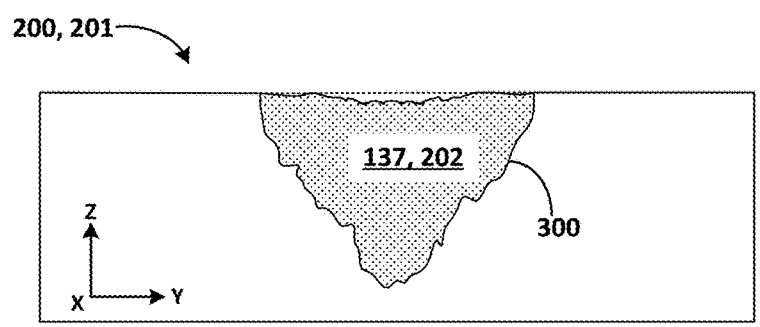

In some embodiments, a boundary of a plurality of consolidation tracks 202 may be determined. One or more dimensional properties of the plurality of consolidation tracks 202 may be determined, such as one or more geometric properties, one or more algebraic properties, and/or one or more statistical properties. For example, a height (h), a width (w), and/or an area (A) of respective consolidation tracks 202 may be determined. Additionally, or in the alternative, an equation representing one or more dimensional properties of the respective consolidation tracks 202 may be determined, such as a boundary equation representing a boundary of the respective consolidation tracks 202. While the digital representation 200, such as a micrographic image 201, depicted in FIG. 2 shows a transverse cross-sectional view, it will be appreciated that a digital representation 200, such a micrographic image 201, of an additively manufactured three-dimensional object 114 may be obtained from any one or more orientations. For example, as shown in FIGS. 3A-3C a digital representation 200, such a micrographic image 201, may be obtained for a top cross-sectional view (FIG. 3A), a longitudinal cross-sectional view (FIG. 3B), and/or a transverse cross-sectional view (FIG. 3C). In some embodiments, one or more consolidation tracks 202 and/or consolidation domains 137 may be partially obscured by adjacent consolidation tracks 202 and/or consolidation domains 137. Partially obscured consolidation tracks 202 and/or consolidation domains 137 may be determined by extrapolation from unobscured portions and/or from a statistical inference determined from other consolidation tracks 202 and/or consolidation domains 137.

One or more properties of the plurality of consolidation tracks 202 may be determined from digital representations 200, such micrographic images 201, corresponding to respective orientations of the object 114, including height (h), width (w), area (A), and/or equations representing one or more dimensional properties of the respective consolidation tracks 202. A three-dimensional representation of a consolidation track 202 may be determined from a plurality of digital representations 200, such as digital representations 200 (e.g., micrographic images 201) representing top, longitudinal, and/or transverse cross-sectional views respectively shown in FIGS. 3A-3C.

As shown in FIGS. 3A-3C, in some embodiments, a computer vision program may be utilized to determine a consolidation boundary 300, such as a melt pool boundary, from a digital representation 200, such as a micrographic image 201, of a three-dimensional object. Additionally, or in the alternative, a consolidation boundary 300, such as a melt pool boundary, may be determined visually, for example, with a human eye, from a visual rendering of a digital representation 200, such as a micrographic image 201. As shown, a consolidation boundary 300 may have somewhat irregular boundaries, which may be attributable at least in part to variations in the additive manufacturing process, such as, in the case of a powder bed technology, variations in heat transfer from the consolidation domain 137 to the powder bed 136 and/or adjacent consolidation tracks 202.

Figure 4A:
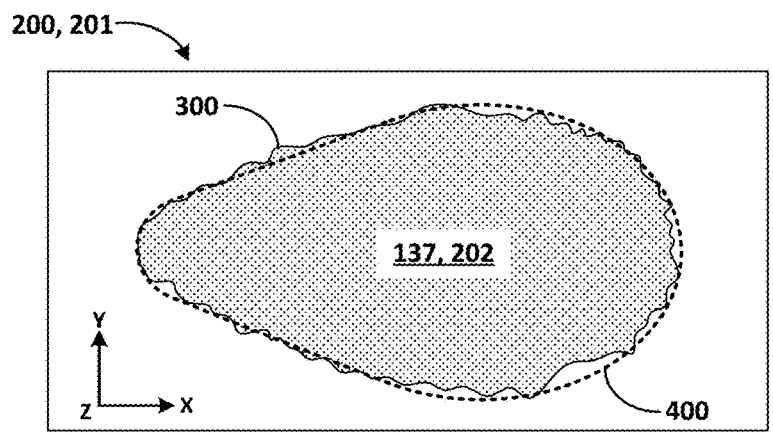
FIGS. 4A-4C schematically depict an exemplary top cross-section, a longitudinal cross-section, and a lateral cross-section, of a respective approximate consolidation domain corresponding to the respective consolidation tracks depicted in FIGS. 3A-3C.
Figure 4B:
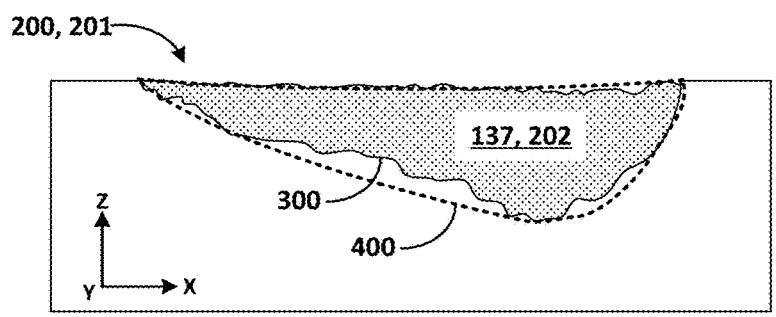
Figure 4C:
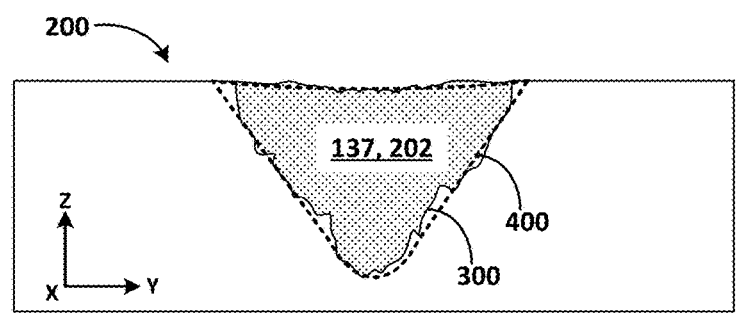

As shown in FIGS. 4A-4C, an approximate consolidation domain 400 may be determined for one or more consolidation tracks 202, such as for a consolidation boundary 300. An approximate consolidation domain 400 may represent an approximation of a domain occupied by a consolidation track 202. An approximate consolidation domain 400 may have an approximate consolidation boundary 402 that represents an approximation of a consolidation boundary 300. An approximate consolidation domain 400 may be determined using an algorithm, such as a curve fitting algorithm. Additionally, or in the alternative, an approximate consolidation domain may be determined using a data library that includes geometric approximation candidates. A geometric approximation candidate may be selected using by comparing one or more geometric approximation candidates to one or more approximate consolidation domains 400 and/or consolidation boundaries 300. In some embodiments, the one or more geometric approximation candidates may be selected by visual comparison, for example, with a human eye, to one or more approximate consolidation domains 400 and/or consolidation boundaries 300. Additionally, or in the alternative, the one or more geometric approximation candidates may be selected using a computer algorithm, such as a computer vision program, configured to compare the one or more geometric approximation candidates to one or more approximate consolidation domains 400 and/or consolidation boundaries 300.

In some embodiments, geometric approximation candidates may be generated using graphic design software, drafting software, computer-aided design software, drawing software, or the like. Additionally, or in the alternative, geometric approximation candidates may be generated using a curve fitting algorithm. A data library may include a plurality of geometric approximation candidates generated using a curve fitting algorithm. An approximate consolidation domain 400 and/or an approximate consolidation boundary 402 may be determined with a statistical confidence level. For example, an approximate consolidation domain 400 and/or an approximate consolidation boundary 402 may be determined within a range that represents a statistical confidence level.

Exemplary curve fitting algorithms may include algebraic fitting algorithms, geometric fitting algorithm, and the like. In some embodiments, such as in the case of an algebraic fitting algorithm, an approximate consolidation domain 400 may be determined at least in part using a least squares regression, including a polynomial regression. At least a portion of an approximate consolidation domain 400 may be determined using a conic section function, a parametric function, and/or a trigonometric function. An exemplary function may correspond, for example, to at least a portion of a circle, an ellipses, parabolic arc, and/or a hyperbolic arc. In some embodiments, such as in the case of a geometric fitting algorithm, a consolidation domain 400 may be determined at least in part using an algorithm that minimizes the square sum of the shortest distances between the approximate consolidation domain and the consolidation boundary 300, for example, using nonlinear minimization. The square sum of the shortest distances may be determined using costs functions. The cost functions may be minimized using a coordinate based algorithm and/or a distance-based algorithm. Additionally, or in the alternative, the cost functions may be minimized using a total method and/or a variable-separation method. For example, an exemplary geometric fitting algorithm may utilize a combination of a variable-separation method and a coordinate-based algorithm.

Exemplary geometric approximation candidates in a data library may be derived from any number of geometric domains having any number of configurations, arrangements, and/or dimensions. Exemplary geometric domains may include at least a segment of any one or more polygonal domains, and/or at least a segment of any one or more circular, elliptical, parabolic, and/or hyperbolic domains, and/or a combination thereof. In some embodiments, geometric approximation candidates may be determined and/or generated using a curve fitting algorithm and stored in a data library for use in determining an approximate consolidation domain 400. Additionally, or in the alternative, exemplary geometric approximation candidates may be determined and/or generated based at least in part on one or more geometric shapes, and/or based at least in part on one or more dimensional properties of a geometric shape, such as a width and/or a height, and so forth. For example, a user and/or a computer program may select a geometric shape and/or one or more dimensional properties of the geometric shape. The user and/or the computer may determine the geometric approximation candidate based at least in part on the selected geometric domain and/or the one or more dimensional properties thereof.

An approximate consolidation domain 400 may be determined at least in part form a geometric approximation candidate using visual comparison, for example, with a human eye. Additionally, or in the alternative, an approximate consolidation domain 400 may be determined at least in part form a geometric approximation candidate using a comparison algorithm, such as a boundary matching algorithm, a shape matching algorithm, a boundary based shape similarity algorithm, or the like. An exemplary comparison algorithm may be based at least in part on a Hamming distance algorithm and/or a Hausdorff distance algorithm. A Hamming distance algorithm may be configured to measure the area of symmetric difference between a geometric approximation candidate and a consolidation track 202, such as a consolidation boundary 300. When a geometric approximation candidate and a consolidation track 202, such as a consolidation boundary 300, are identical, and properly aligned, the Hamming distance will be zero. The Hamming distance increases as a geometric approximation candidate and a consolidation track 202 increasingly differ, up to a maximum Hamming distance equal to the sum of the area of the geometric approximation candidate and the consolidation track 202 in the case when they are completely disjoint. A Hausdorff distance algorithm may be configured to identify a maximum of a distance form a point on a geometric approximation candidate to a nearest point on a consolidation track 202, such as a consolidation boundary 300.

In some embodiments, an exemplary comparison algorithm may utilize a skeleton-based shape matching, for example, using skeletal voxels connected in a stick-figure representation of the respective geometric approximation candidates and consolidation tracks 202. The skeletal voxels may be determined using volumetric thinning. The skeletal voxels resulting from volumetric thinning may be clustered and connected to provide a skeletal graph suitable for shape graph matching.

Additionally, or in the alternative, an exemplary comparison algorithm may utilize a neural network. An exemplary neural network may categorize a plurality of geometric approximation candidates based on one or more classification features, such as type of shape (e.g., polygonal, elliptical, etc.), area, number of sides, and number of curves, and so forth. A neural network training algorithm may be utilized to determine a classification algorithm that determines a classification for a consolidation track 202, such as a consolidation boundary 300. The consolidation track 202 may be compared to one or more geometric approximation candidates that match the one or more classification features of the consolidation track 202. A shape matching algorithm may be utilized to determine a geometric approximation candidate from among a plurality that match the one or more classification features.

A plurality of geometric approximation candidates, such as from a data library, may be compared to a consolidation track 202, such as a consolidation boundary 300. An approximate consolidation domain 400 may be determined from a geometric approximation candidate selected, for example, based at least in part on a comparison a consolidation track 202. In some embodiments, a geometric approximation candidate may be selected as an approximate consolidation domain 400 for a consolidation track 202 when the geometric approximation candidate satisfies one or more selection criteria. For example, a geometric approximation candidate may be selected as an approximate consolidation domain 400 for a consolidation track 202 when the geometric approximation candidate satisfies a shape similarity threshold with respect to the consolidation track 202. Additionally, or in the alternative, a geometric approximation candidate may be selected from among a plurality based at least in part on a closest degree of similarity to the consolidation track 202 relative to the other geometric approximation candidates among the plurality.

In some embodiments, a selected geometric approximation candidate may be augmented to increase a degree of similarity to the consolidation track 202. For example, a shape augmentation algorithm may be utilized to conform the selected geometric approximation candidate to the consolidation track 202. The shape augmentation algorithm may be configured to apply one or more augmentation operations configured, for example, to resize, stretch, shrink, skew, and/or twist, at least a portion of the selected geometric approximation candidate.

Figure 5:
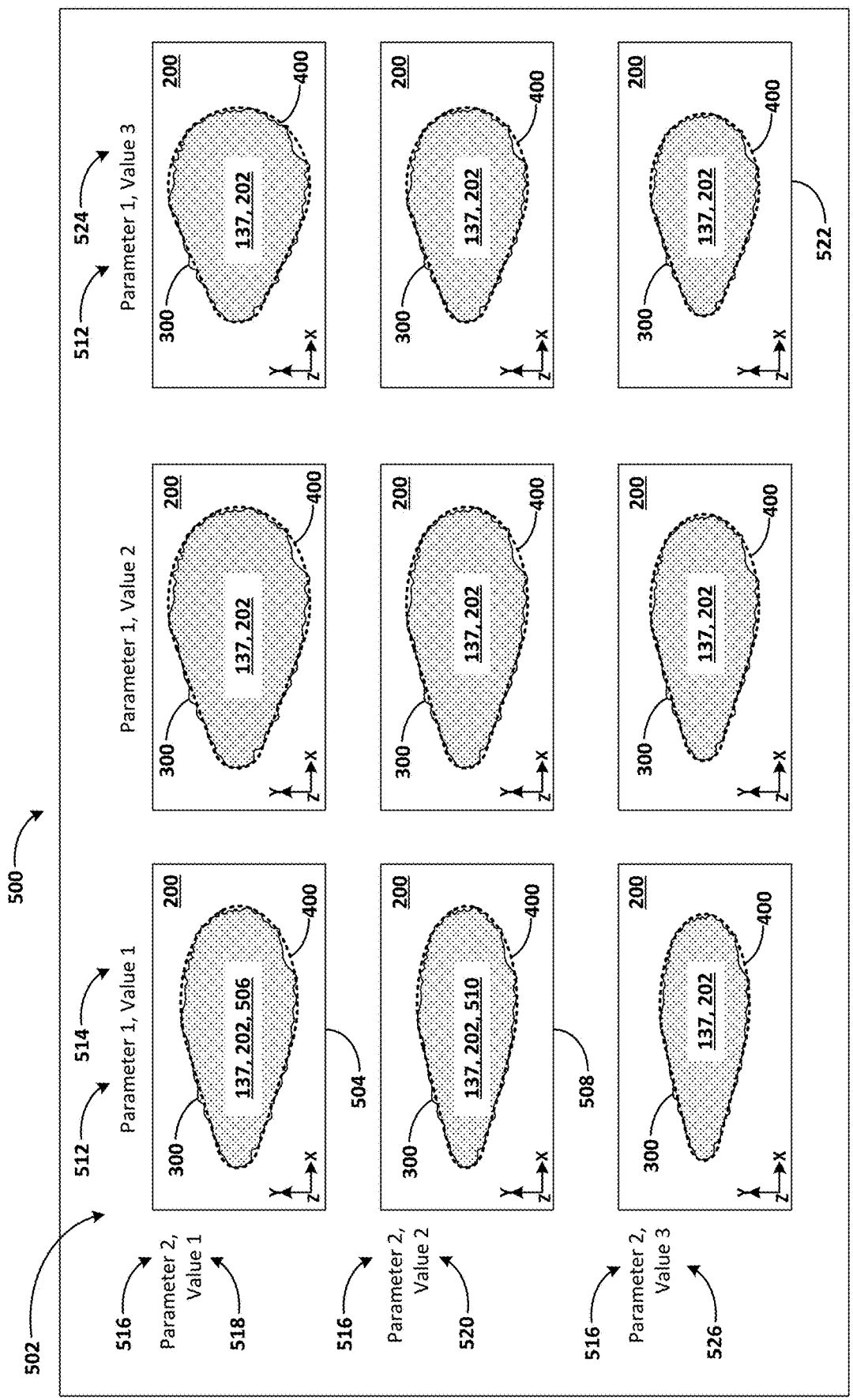
FIG. 5 schematically depicts a plurality of top cross-sectional views of exemplary consolidation tracks formed by irradiation with respectively different irradiation parameter values, overlain by an approximate consolidation domain corresponding of the respective consolidation track.

Turning now to FIG. 5, an approximate consolidation domain 400 may be determined from a plurality of consolidation tracks 202, such as a multitude of consolidation tracks 202. A plurality of consolidation tracks 202 may be analyzed to determine statistical relationship between one or more irradiation parameters and one or more dimensional properties of the consolidation tracks 202 formed when irradiating a powder material 120 with respective irradiation parameter values. Additionally, or in the alternative, a plurality of consolidation domains 400 may be analyzed to determine statistical relationship between one or more irradiation parameters and one or more dimensional properties of the consolidation domains 400 determined from the consolidation tracks 202, and/or between the one or more dimensional properties of the consolidation domains 400 and one or more dimensional properties of the consolidation tracks 202 formed when irradiating with respective irradiation parameter values. The quantity of consolidation tracks 202 may be selected to satisfy a statistical confidence level for respective relationships being analyzed. Exemplary irradiation parameters that may be considered include, by way of example, power, intensity, intensity profile, power density, spot size, spot shape, scanning pattern, scanning speed, and so forth. An analysis may be performed and/or repeated for a number of different powder materials, such as powder materials having different elemental compositions and/or powder materials having different particle sizes and/or size distributions. In some embodiments, one or more irradiation parameters may be varied. Additionally, or in the alternative, a plurality of irradiation parameters may remain constant.

The consolidation tracks 202 may be generated by irradiation performed with a plurality of different irradiation parameter values. One or more dimensional properties of a consolidation track 202 and/or an approximate consolidation domain 400 may vary depending on a value for one or more irradiation parameter when irradiating the build plane 130 to form the consolidation tracks 202. As shown in FIG. 5, in some embodiments, an irradiation parameter matrix 500 may be provided. The irradiation parameter matrix 500 may include a plurality of nodes 502 that define respective irradiation parameter values utilized when forming the consolidation track 202 corresponding to the respective node 502. The consolidation tracks 202 shown in the irradiation parameter matrix 500 may be formed by irradiating a build plane 130 with the respective irradiation parameters having values as specified in the irradiation parameter matrix 500. The approximate consolidation domains 400 shown in the irradiation parameter matrix 500 may be determined from the consolidation tracks 202 formed by irradiating the build plane 130 with the respective irradiation parameters having values as specified in the irradiation parameter matrix 500.

By way of example, a first node 504 may define a plurality of irradiation parameter values for forming a first consolidation track 506, and a second node 508 may define a plurality of irradiation parameter values for forming a second consolidation track 510. In some embodiments, at least one irradiation parameter value may differ as between the first node 504 and the second node 508. Additionally, or in the alternative, the first node 504 and the second node 508 may have at least one common irradiation parameter value. For example, the first node 504 may include a first irradiation parameter 512 that has a first value 514, and a second irradiation parameter 516 that has a first value 518. The second node 508 may include the first irradiation parameter 512 and the second irradiation parameter 516, with the second irradiation parameter 516 having a second value 520 and the first irradiation parameter 512 maintaining the first value 514. A third node 522 may include the first irradiation parameter 512 having a third value 524 and the second irradiation parameter 516 having a third value 526.

An irradiation parameter matrix 500 may include any number of nodes 502 relating any number of irradiation parameters at any number of values. The specific number of nodes 502 in an irradiation parameter matrix 500 may be selected based at least in part on the range of values for variable irradiation parameters with respect to which irradiation may be performed. Additionally, or in the alternative, the specific number of nodes 502 in an irradiation parameter matrix 500 may be selected based at least in part to determine a statistically significant correlation between respective irradiation parameters and one or more dimensional properties of resulting consolidation tracks 202 and/or the approximate consolidation domains 400 determined for the resulting consolidation tracks 202. In some embodiments, one or more irradiation parameters may be varied. Additionally, or in the alternative, a plurality of irradiation parameters may remain constant.

A given node 502 in an irradiation parameter matrix 500 may include any number of samples. The quantity of samples for respective nodes 502 may be determined at least in part to provide a statistical confidence level for one or more dimensional properties of the respective consolidation tracks 202 and/or approximate consolidation domains 400, such as a statistical confidence level for one or more geometric properties, algebraic properties, and/or statistical properties.

An irradiation parameter matrix 500 may be developed for a plurality of irradiation devices 138, 140 and/or for a plurality of regions of a build plane 130. Additionally, or in the alternative, an irradiation parameter matrix 500 may include nodes 502 corresponding to respective ones of a plurality of irradiation devices 138, 140 and/or corresponding to respective ones of a plurality of regions of a build plane 130. For example, a first irradiation parameter matrix 500 may be developed for a first irradiation device 138 and a second irradiation parameter matrix 500 may be developed for a second irradiation device 140. The first and/or second irradiation parameter matrix 500 may include nodes corresponding to a first build plane region 146, a second build plane region 152, and/or an interlace region 154. Additionally, or in the alternative, a third, fourth, and/or fifth irradiation parameter matrix 500 may be developed for a first build plane region 146, a second build plane region 152, and/or an interlace region 154. The third, fourth, and/or fifth irradiation parameter matrix 500 may include nodes corresponding to the first irradiation device 138 and/or the second irradiation device 140.

While the irradiation parameter matrix 500 shown in FIG. 5 depicts top cross-sectional views of consolidation tracks 202 and corresponding approximate consolidation domains 400, it will be appreciated that an irradiation parameter matrix may include consolidation tracks 202 and corresponding approximate consolidation domains 400 for any one or more spatial domains, including two dimensional and/or three-dimensional domains. For example, an irradiation parameter matrix 500 may include top cross-sectional domains, longitudinal cross-sectional domains, and/or transverse cross-sectional domains. Additionally, or in the alternative, one or more two-dimensional domains may be combined for provide a three-dimensional domain.

Figure 6A:
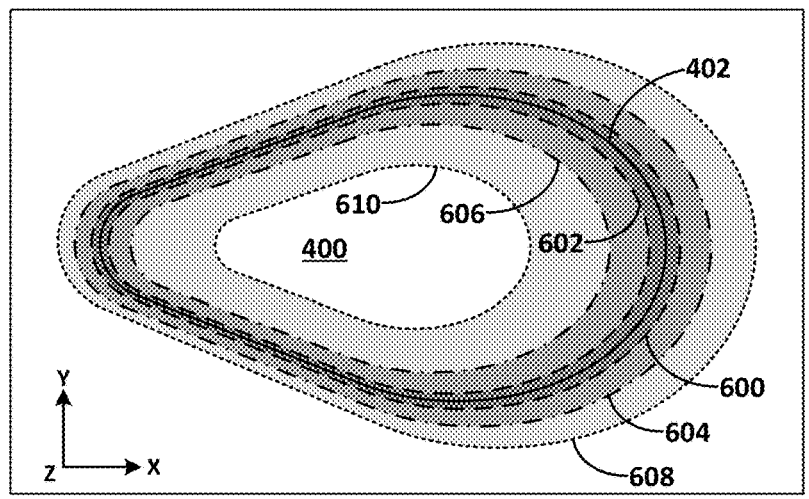
FIGS. 6A-6C schematically depict an exemplary probability map of a top cross-section, a longitudinal cross-section, and a lateral cross-section, respectively, of an approximate consolidation domain corresponding to a consolidation track formed by irradiation with given irradiation parameter values.
Figure 6B:
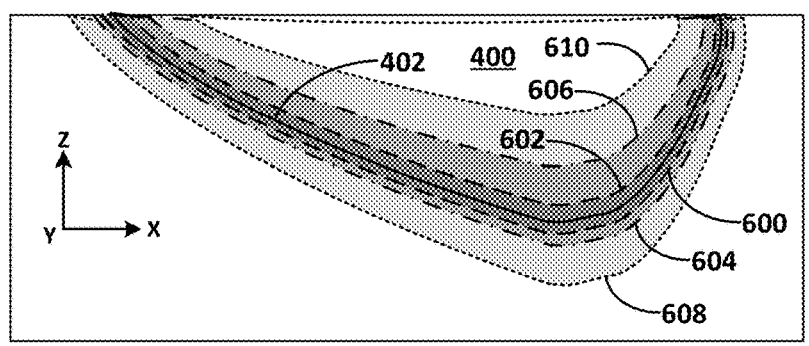
Figure 6C:
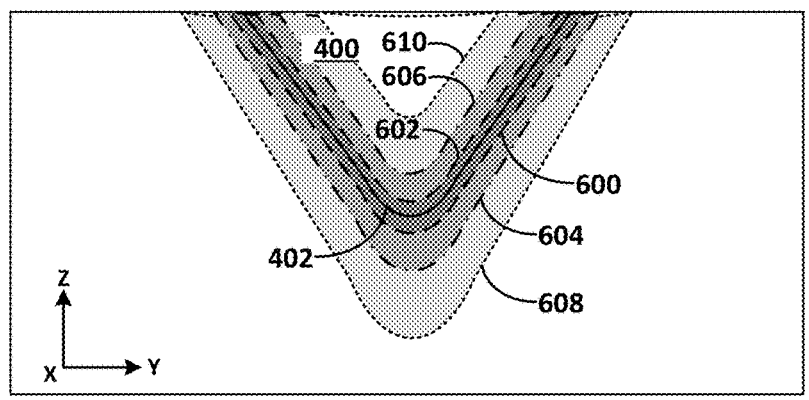

Now turning to FIGS. 6A-6C, in some embodiments, an approximate consolidation domain 400 and/or an approximate consolidation boundary 402 may be determined based at least in part on one or more statistical parameters, for example, based at least in part on data from an irradiation parameter matrix 500. Additionally, or in the alternative, an approximate consolidation domain 400 and/or an approximate consolidation boundary 402 may be determined from one or more discrete measurements without requiring use of an irradiation parameter matrix 500. In some embodiments, an approximate consolidation domain 400 may include an approximate consolidation boundary 402 that represents a mean, a median, or a mode. The approximate consolidation domain 400 and/or the approximate consolidation boundary 402 may be determined with a statistical confidence level. Additionally, or in the alternative, an approximate consolidation domain 400 may include an inward approximate consolidation boundary 402 and/or an outward approximate consolidation boundary 402 that represents a statistical confidence interval or range. The statistical confidence interval or range may be based at least in part on a statistical variance and/or a standard deviation.

FIGS. 6A-6C show probability maps of approximate consolidation domains 400. As shown in FIGS. 6A-6C, an approximate consolidation domain 400 may include a 1-sigma outward approximate consolidation boundary 600 and a 1-sigma inward approximate consolidation boundary 602. A range between the 1-sigma outward approximate consolidation boundary 600 and the 1-sigma inward approximate consolidation boundary 602 may represent one standard deviation for the approximate consolidation domain 400 and/or the approximate consolidation boundary 402. Additionally, or in the alternative, an approximate consolidation domain 400 may include a 2-sigma outward approximate consolidation boundary 604 and a 2-sigma inward approximate consolidation boundary 606. A range between the 2-sigma outward approximate consolidation boundary 604 and the 2-sigma inward approximate consolidation boundary 606 may represent two standard deviations for the approximate consolidation domain 400 and/or the approximate consolidation boundary 402. Additionally, or in the alternative, an approximate consolidation domain 400 may include a 3-sigma outward approximate consolidation boundary 608 and a 3-sigma inward approximate consolidation boundary 610. A range between the 3-sigma outward approximate consolidation boundary 608 and the 3-sigma inward approximate consolidation boundary 610 may represent three standard deviations for the approximate consolidation domain 400 and/or the approximate consolidation boundary 402. It will be appreciated that the outward and inward approximate consolidation boundaries are provided by way of example and are not intended to be limiting. In fact, an approximate consolidation domain 400 may include an outward approximate consolidation boundary and/or an inward approximate consolidation boundary corresponding to any sigma level, including 4-sigma, 5-sigma, 6-sigma, and so forth.

Figure 7A:
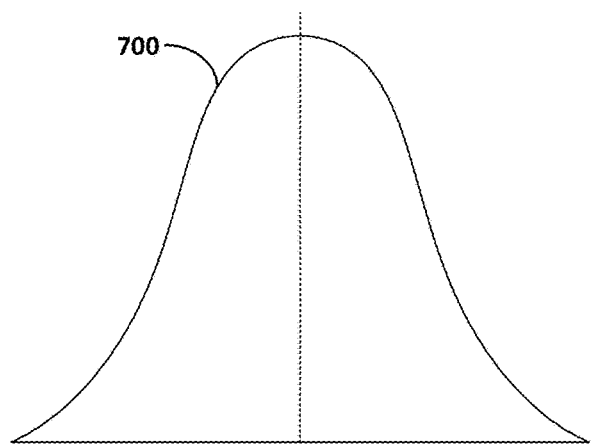
FIGS. 7A-7C schematically depict an exemplary probability distribution of a top cross-sectional dimension, a longitudinal cross-sectional dimension, and a lateral cross-sectional dimension, respectively, corresponding to a consolidation track formed by irradiation with given irradiation parameter values.
Figure 7B:
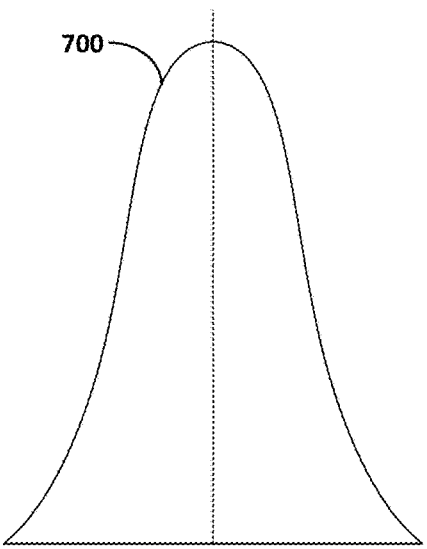
Figure 7C:
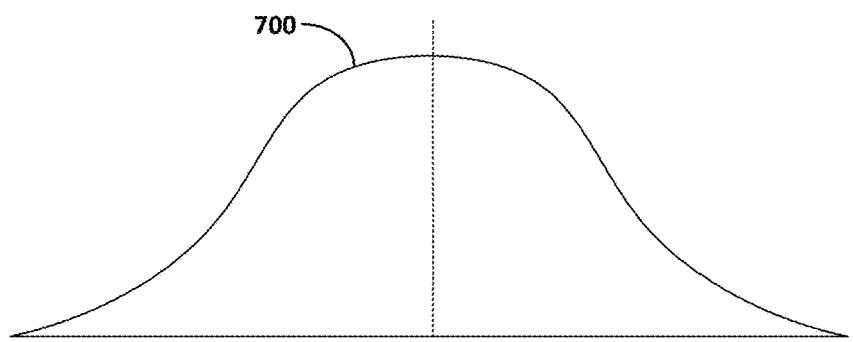

As shown in FIGS. 7A-7C, one or more dimensional properties of a consolidation track 202 formed by irradiating a build plane 130 with given irradiation parameter values may have a distribution of probable values. The distribution of probable values for a given dimensional property may be represented by a probability curve 700, such as a normal distribution curve, a Gaussian distribution curve, a Poisson distribution curve, a Chi-square distribution curve, or the like. The distribution of probable values represented by the probability curves 700 shown in FIGS. 7A-7C may correspond to data from an irradiation parameter matrix 500 and/or to the one or more statistical parameters determined therefrom. Additionally, or in the alternative, the distribution of probable values represented by the probability curves 700 shown in FIGS. 7A-7C may correspond to the approximate consolidation domain 400 and/or the approximate consolidation boundary 402 determined from the irradiation parameter matrix 500 and/or to the one or more statistical parameters determined thereof.

By way of example, in some embodiments, the probability curves 700 shown in FIGS. 7A-7C may represent a distribution for a dimensional property of a consolidation track 202 and/or a consolidation boundary 300, and/or a dimensional property of an approximate consolidation domain 400 and/or an approximate consolidation boundary 402. For example, the probability curve 700 shown in FIG. 7A may represent a distribution for a width, length, or area of a top cross-sectional domain. The probability curve 700 shown in FIG. 7B may represent a distribution for a width, length, or area of a longitudinal cross-sectional domain. The probability curve 700 shown in FIG. 7C may represent a distribution for a width, length, or area of a transverse cross-sectional domain. Additionally, or in the alternative, the probability curves 700 shown in FIGS. 7A-7C may represent a parameter, such as a variable parameter or a constant parameter, of an equation representing one or more dimensional properties of the respective consolidation tracks 202 may be determined, such as a boundary equation representing a boundary of the respective consolidation tracks.

Now referring to FIGS. 8A-8E, FIGS. 9A-9D, and 10A-10E, exemplary simulated additively manufactured three-dimensional and exemplary additive manufacturing simulations will be further described. FIGS. 8A-8E schematically depict exemplary simulated additively manufactured three-dimensional objects 800. The simulated additively manufactured three-dimensional objects 800 include a plurality of simulated consolidation layers 802 respectively including a plurality of approximate consolidation domains 400. The geometric dimensions, and/or the configuration and arrangement, of the simulated consolidation layers 802 and the respective approximate consolidation domains 400 may be determined as described herein. In some embodiments, one or more simulated consolidation artifacts 804 may be determined in the simulated additively manufactured three-dimensional objects 800. One or more material properties of an actually additively manufactured object 114 may be determined based at least in part on the presence of one or more simulated consolidation artifacts 804. Such one or more material properties of an additively manufactured object 114 may be determined based at least in part on the presence of simulated consolidation artifacts 804 in a simulated consolidation layer 802 and/or a simulated additively manufactured three-dimensional object 800. Exemplary material properties that may be determined include: porosity, void sizes, void area, void aspect ratio, void maximum size, density, elastic modulus, yield strength, ductility, hardness, surface finish, mass, fatigue limit, creep, and so forth. Further exemplary material properties that may be determined include grain structures and/or crystalline structures, such as coarse grain regions, microcrystalline grain regions, nanocrystalline grain regions, amorphous regions, precipitates, crystalline dislocations, twinning dislocations, and the like. Further exemplary material properties that may be determined include unmelted powder particles, unsintered powder particles, unbound binder particles, and the like.

Exemplary simulated consolidation artifacts 804 may include void elements 806 and/or overlap elements 808. Void elements 806 represent portions of the simulated additively manufactured three-dimensional object 800 that are not occupied by at least one approximate consolidation domains 400. Overlap elements 808 represent portions of the simulated additively manufactured three-dimensional object 800 that are overlapped by a plurality of approximate consolidation domains 400. Overlap elements may include portions of the simulated additively manufactured three-dimensional object 800 that include an overlap of two, three, four, or more approximate consolidation domains 400. Void elements 806 may correspond to voids, pores, incomplete melting or sintering or non-sintered or non-melted powder material 120, or regions without binder material, or the like, in an actual three-dimensional object 114 manufactured based on the simulated additively manufactured three-dimensional object 800. Overlap elements 808 may correspond to solid portions of an actual three-dimensional object 114 manufactured based on the simulated additively manufactured three-dimensional object 800. In some embodiments, too little overlap between approximate consolidation domains 400 may correspond to voids, pores, incomplete melting or sintering or non-sintered or non-melted powder material 120, or the like in a three-dimensional object 114 manufactured based on the simulated additively manufactured three-dimensional object 800. However, in some embodiments, too much overlap between approximate consolidation domains 400 and/or too many overlap elements 808 may also introduce voids, pores, incomplete melting or sintering or non-sintered or non-melted powder material 120, or the like in a three-dimensional object 114 manufactured based on the simulated additively manufactured three-dimensional object 800. For example, too much overlap between approximate consolidation domains 400 and/or too many overlap elements 808 may correspond to excessively high localized temperatures that may lead to vaporization, sputtering, or the like in the three-dimensional object 114. By way of example, the presence and/or quantity of overlap elements 808 that include more than two overlapping approximate consolidation domains 400, such as three, four, or more approximate consolidation domains 400, may correspond to excessively high localized temperatures that may lead to vaporization, sputtering, or the like in the three-dimensional object 114. Such vaporization, sputtering, or the like may introduce voids, pores, incomplete melting or sintering or non-sintered or non-melted powder material 120, or the like in the three-dimensional object 114.

The presence of void elements 806 may depend at least in part on the configuration and arrangement of the respective approximate consolidation domains 400 in the respective simulated consolidation layers 802 relative to one another and/or on the configuration and arrangement of the respective simulated consolidation layers 802 relative to one another. Additionally, or in the alternative, the quantity and/or size of void elements 806 may depend at least in part on the configuration and arrangement of the respective approximate consolidation domains 400 in the respective simulated consolidation layers 802 relative to one another and/or on the configuration and arrangement of the respective simulated consolidation layers 802 relative to one another. The presence of overlap elements 808 may depend at least in part on the configuration and arrangement of the respective approximate consolidation domains 400 in the respective simulated consolidation layers 802 relative to one another and/or on the configuration and arrangement of the respective simulated consolidation layers 802 relative to one another. Additionally, or in the alternative, the quantity and/or size of overlap elements 808 may depend at least in part on the configuration and arrangement of the respective approximate consolidation domains 400 in the respective simulated consolidation layers 802 relative to one another and/or on the configuration and arrangement of the respective simulated consolidation layers 802 relative to one another.

It will be appreciated that the simulated consolidation artifacts 804 described herein, such as the void elements 806 and the overlap elements 808, are provided by way of example and not to be limiting. In fact, the simulated consolidation artifacts 804 may include any one or more types of artifacts that may be determined in an additively manufactured three-dimensional object 114, such as by way of a digital representation 200, such as a micrographic image 201, or the like. Further exemplary simulated consolidation artifacts 804 may include unmelted powder particles, unsintered powder particles, unbound binder particles, and the like. Additionally, or in the alternative, exemplary simulated consolidation artifacts 804 may include grain structures and/or crystalline structures, such as coarse grain structures, microcrystalline grain structures, nanocrystalline grain structures, amorphous regions, precipitates, crystalline dislocations, twinning dislocations, and the like.

In some embodiments, the simulated consolidation artifacts 804 may be determined by way of a geometric analysis of the simulated additively manufactured three-dimensional object 800. Additionally, or in the alternative, the simulated consolidation artifacts 804 may be determined using a computer vision program such as a contour tracing algorithm and/or a boundary tracing algorithm. In some embodiments, respective approximate consolidation domains 400 and/or one or more regions thereof may be assigned one or more computer generated colorimetry parameter, such as a grayscale parameter, an RGB color parameter, and/or a transparency parameter. The computer vision program may be configured to determine the one or more simulated consolidation artifacts 804 based at least in part on the computer generated colorimetry parameter assigned to the respective approximate consolidation domains 400 and/or to the one or more regions thereof.

Figure 8A:
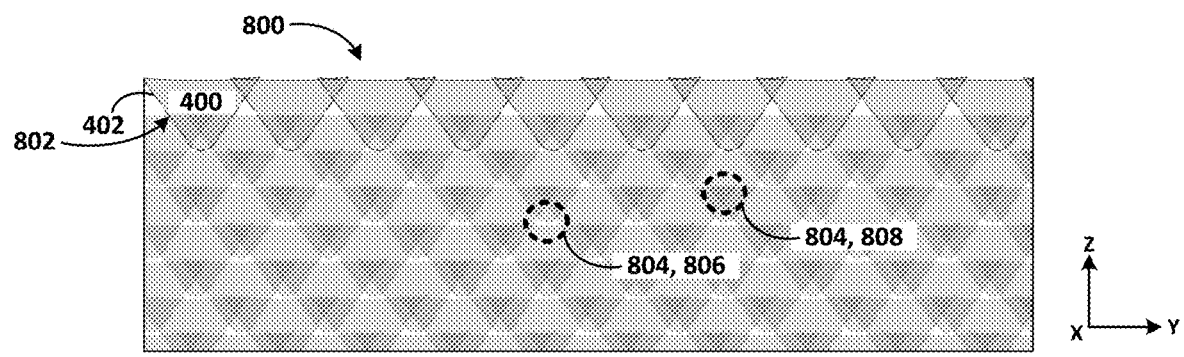
FIGS. 8A-8C schematically depict cross-sectional view of exemplary simulated additively manufactured three-dimensional objects determined from an additive manufacturing simulation.
Figure 8B:
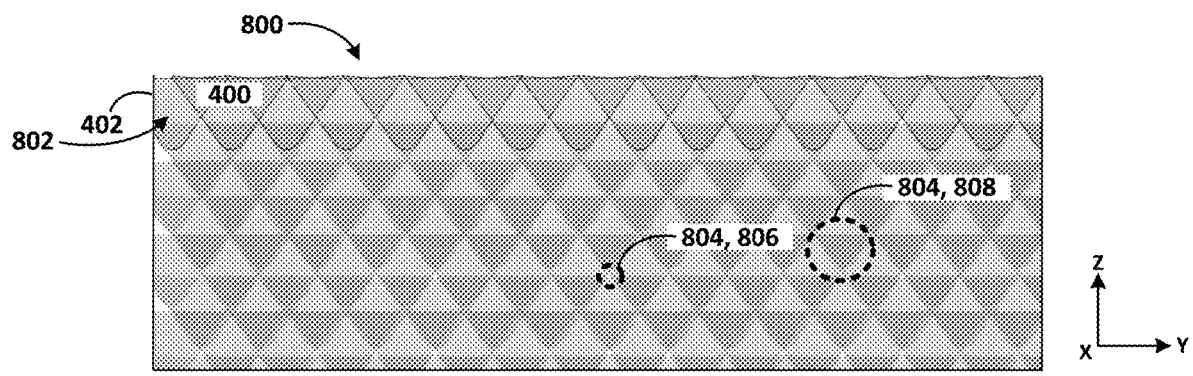
Figure 8C:
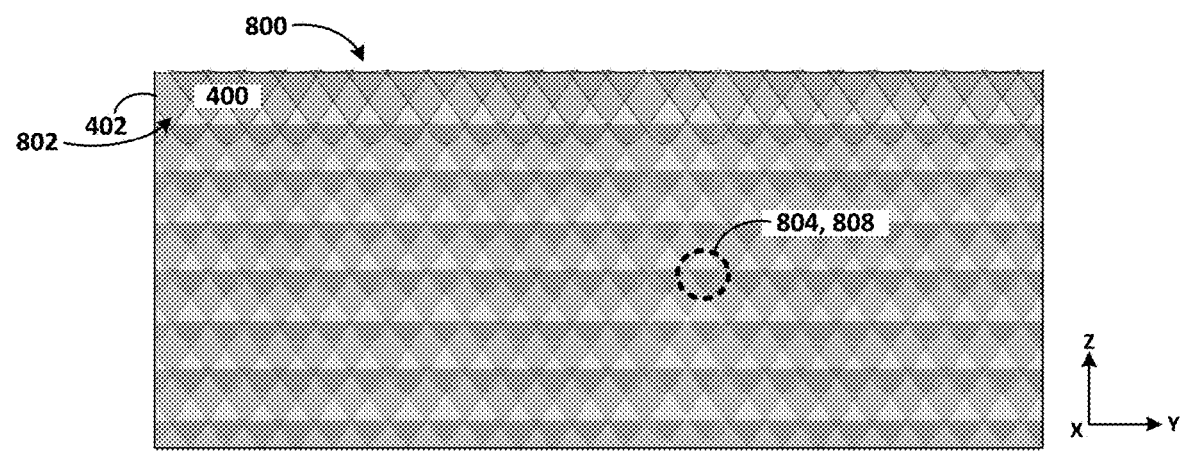

By way of example, as shown in FIGS. 8A-8E, respective approximate consolidation domains 400 have been assigned a grayscale parameter and a transparency parameter, such that overlap elements 808 may appear relatively darker, and void elements 806 may appear white. Overlap elements 808 may appear increasingly darker with increasing number of approximate consolidation domains 400 overlapping one another. For example, as shown in FIG. 8A, a relatively wide hatch width 810 and/or a relatively tall layer height 816 may yield a simulated additively manufactured three-dimensional object 800 with a relatively high prevalence of void elements 806 as indicated, for example, by whitespace in the simulated additively manufactured three-dimensional object 800. Additionally, or in the alternative, a relatively higher degree of overlapping approximate consolidation domains 400 as shown in FIGS. 8B and 8C may yield fewer void elements 806 and/or a relatively higher prevalence of overlap elements 808, as indicated, for example, by darker grayscale values.

It will be appreciated that the embodiments described herein, such as with reference to FIGS. 8A-8E, are given by way of example only and not to be limiting. In fact, other computer generated colorimetry parameters may be utilized without departing from the scope of the present disclosure. Additionally, or in the alternative, other computer vision programs may be utilized in addition or in the alternative those described herein without departing from the scope of the present disclosure.

In some embodiments, the respective scaling of one or more computer generated colorimetry parameters may be determined based at least in part on a probability distribution, a statistical variance, and/or a standard deviation, as described herein. Respective ones of one or more computer generated colorimetry parameters may correspond to respective material properties depicted in the simulated additively manufactured three-dimensional object 800.

Figure 8D:
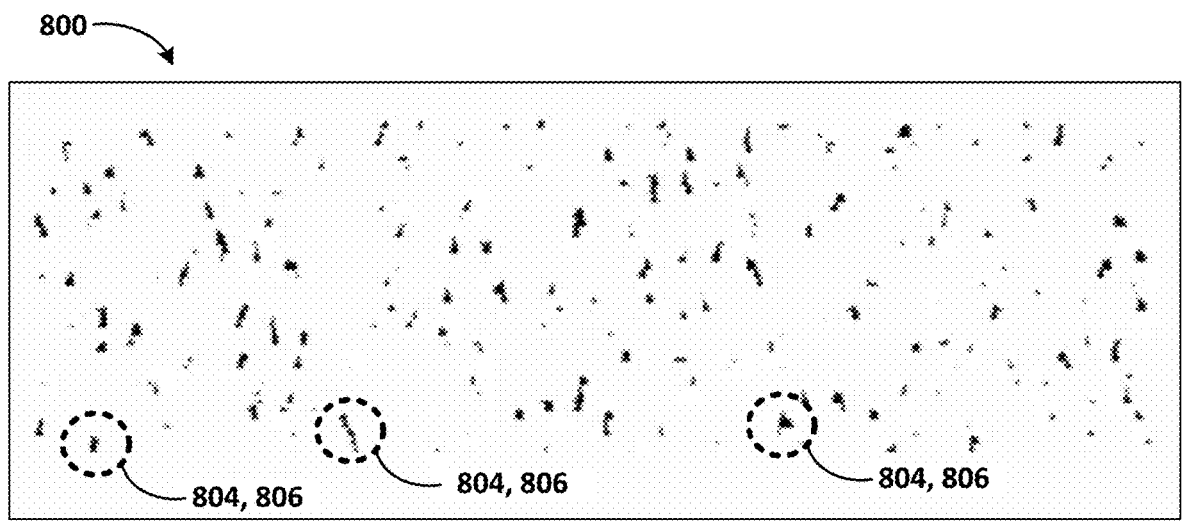
FIG. 8D schematically depicts a cross-sectional view of an exemplary simulated additively manufactured three-dimensional object that exhibits simulated consolidation artifacts.

By way of example, FIG. 8D shows an exemplary simulated additively manufactured three-dimensional object 800. The simulated additively manufactured three-dimensional object 800 may include a plurality of void elements 806 determined in accordance with the present disclosure. In some embodiments, as shown, for example, in FIG. 8D, a simulated additively manufactured three-dimensional object 800 may include one or more simulated consolidation artifacts 804, such as void elements 806, may be depicted by a computer generated colorimetry parameter. Other portions of the simulated additively manufactured three-dimensional object 800 may be removed or omitted from the simulated additively manufactured three-dimensional object 800 to more readily reveal the one or more simulated consolidation artifacts 804, such as void elements 806. Additionally, or in the alternative, the one or more simulated consolidation artifacts 804, such as void elements 806, may be depicted with a high-contrast computer generated colorimetry parameter. For example, as shown in FIG. 8D, the void elements 806 may be depicted in black and the remainder of the simulated additively manufactured three-dimensional object 800 may be depicted in white.

Figure 8E:
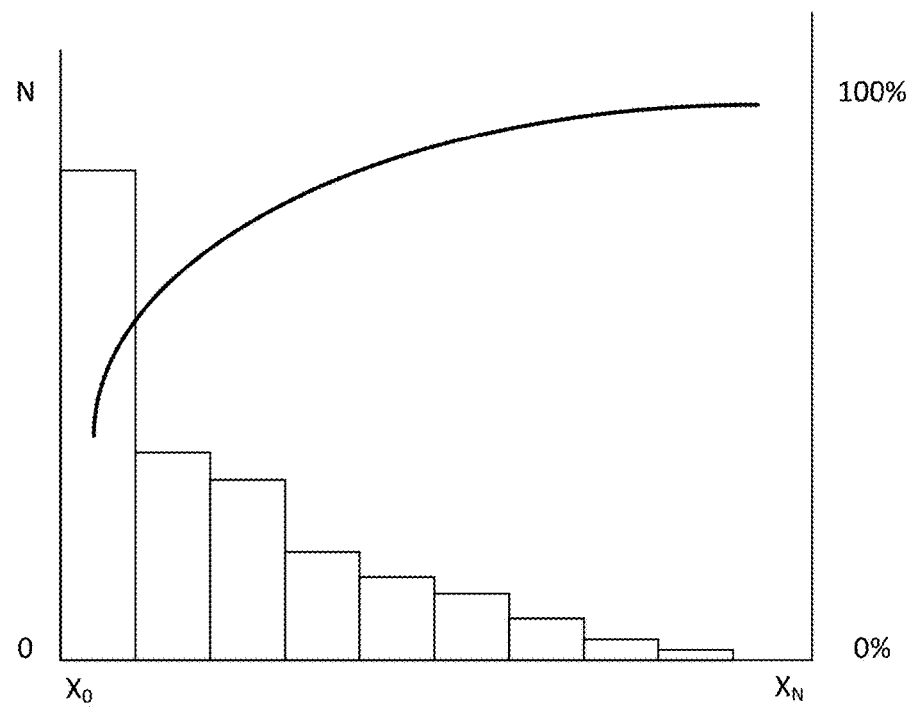
FIG. 8E shows a graph depicting a number and percentage distribution of the void elements shown in the cross-sectional view of the simulated additively manufactured three-dimensional object of FIG. 8D.

In some embodiments, a probability distribution of one or more simulated consolidation artifacts 804, such as void elements 806, may be determined. For example, FIG. 8E shows an exemplary probability distribution of void elements 806 corresponding to the simulated additively manufactured three-dimensional object 800 shown in FIG. 8D. A probability distribution for one or more other simulated consolidation artifacts 804 may be determined similarly, such as for overlap elements 808. The probability distribution may include a distribution of the quantity of simulated consolidation artifacts 804, such as a distribution of the quantity of void elements 806 as a function of a dimensional property of the void elements, such as cross-sectional width and/or area, or the like. One or more material properties, such as porosity, void sizes, void area, void aspect ratio, void maximum size, density, elastic modulus, yield strength, ductility, hardness, surface finish, mass, fatigue limit, creep, and the like, may be determined for an additively manufactured three-dimensional object 114 to be manufactured based at least in part on a simulated additively manufactured three dimensional object 800 determined from an additive manufacturing simulation. In some embodiments, the one or more material properties may be determined based at least in part on the probability distribution of the one or more simulated consolidation artifacts 804. Additionally, or in the alternative, one or more material properties may be determined based at least in part on one or more deterministic properties of the one or more simulated consolidation artifacts 804, such as numerical thresholds, maximums, minimums, or the like for one or more simulated consolidation artifacts 804.

As shown in FIGS. 8A-8C, 9A-9D, and 10A-10E, a plurality of approximate consolidation domains 400 may be configured and arranged relative to one another to simulate respective layers of consolidation tracks 202 in a build plane 130. The simulated layers of consolidation tracks 202 may be utilized in an additive manufacturing simulation, such as to provide a simulated additively manufactured three-dimensional object 800. A plurality of approximate consolidation domains 400 may be configured and arranged to define a simulated consolidation layer 802. In some embodiments, one or more material properties of an actually additively manufactured object 114 may be determined based at least in part on one or more dimensional properties of the plurality of approximate consolidation domains 400. For example, the one or more material properties may be determined based at least in part on the geometric shape of the plurality of approximate consolidation domains 400 and/or the configuration and arrangement of the plurality of approximate consolidation domains 400 in a simulated consolidation layer 802 and/or a simulated additively manufactured three-dimensional object 800. Additionally, or in the alternative, the one or more material properties may be determined based at least in part on one or more geometric properties, one or more algebraic properties, and/or one or more statistical properties.

As shown, for example, in FIGS. 9A-9D, the respective approximate consolidation domains 400 in a simulated consolidation layer 802 may be situated horizontally relative to one another according to a hatch width ($H_W$) 810. The hatch width 810 may be determined relative to a longitudinal axis ($A_L$) 812 of an approximated consolidation domain 400 and/or a vertical axis ($A_V$) 814 of an approximated consolidation domain 400. The hatch width 810 may be selected to provide a suitable overlap between adjacent approximate consolidation domains 400. The respective simulated consolidation layers 802 may be situated vertically relative to one another according to a layer height ($L_h$) 816. The layer height 816 may be determined relative to a virtual build plane 818 corresponding to a respective simulated consolidation layer 802. The virtual build plane 818 may be determined based at least in part on a top surface of the respective approximate consolidation domains 400 in the respective simulated consolidation layer 802. The layer height 816 may be selected to provide a suitable overlap between sequential simulated consolidation layers 802.

The hatch width 810 and/or the layer height 816 may be selected based on the applicable additive manufacturing technology. By way of example, for an additive manufacturing technology that utilizes a powder bed technology, the hatch width 810 may be from about 10 micrometers (µm) to about 1000 µm, or such as from about 10 µm to about 200 µm. Additionally, or in the alternative, the layer height 816 may be from about 10 µm to about 1000 µm, such as from about 10 µm to about 200 µm. In other embodiments, the hatch width 810 and/or the layer height 816 may be from about 10 µm to about 2 millimeters (mm), such as from about 10 µm to about 200 µm, such as from about 200 µm to about 2 mm, or such as from about 2 mm to about 50 mm.

Figure 9C:
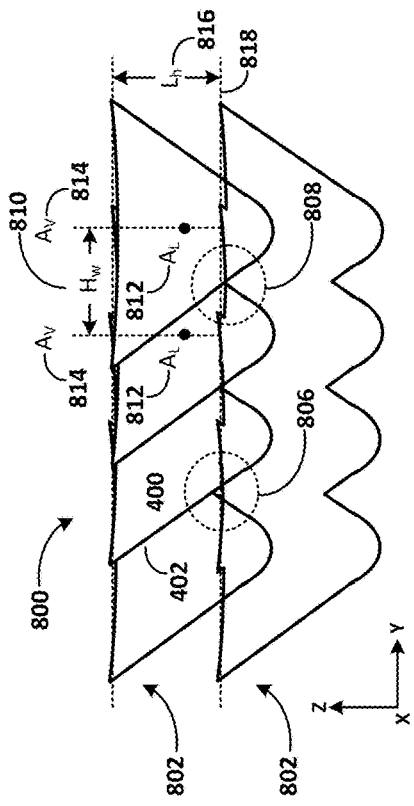
FIGS. 9A-9D schematically depict exemplary configurations and arrangements of approximate consolidation domains for an additive manufacturing simulation.
Figure 9D:
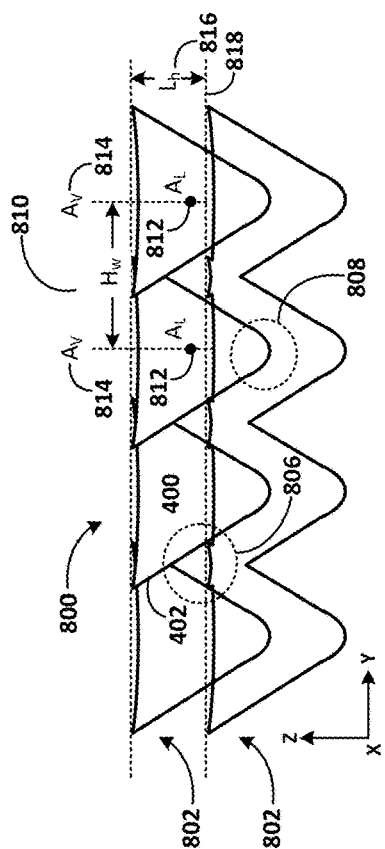
Figure 9A:
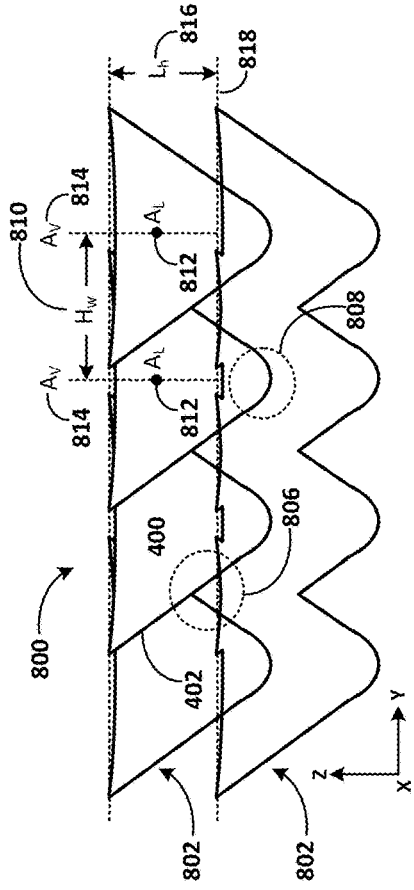

As shown, for example, in FIG. 9A, a simulated additively manufactured three-dimensional object 800 may include one or more simulated consolidation artifacts 804, such as void elements 806 and/or overlap elements 808. As shown, a relatively large hatch width 810 and/or a relatively large layer height 816 may introduce void elements 806 in the simulated additively manufactured three-dimensional object 800. For example, FIG. 9A shows a void element 806 defined by adjacent approximate consolidation boundaries 402 of a plurality of approximate consolidation domains 400. Additionally, or in the alternative, a relatively small layer height 816 and/or a relatively small hatch width may increase the presence of overlap elements 808 in the simulated additively manufactured three-dimensional object 800. For example, FIG. 9A shows an overlap element 808 that includes two overlapping approximate consolidation domains 400.

Figure 9B:
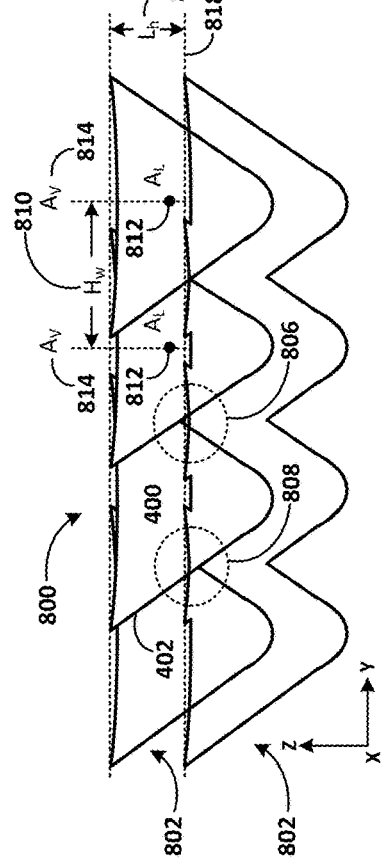

As shown in FIG. 9B, the presence of void elements 806, and/or the quantity and/or size of void elements 806, in the simulated additively manufactured object 800 may be eliminated or reduced, for example, by utilizing a relatively small layer height 816. For example, FIG. 9B shows a void element 806 that is relatively smaller than the corresponding void element 806 in FIG. 9A. Additionally, or in the alternative, the presence of overlap elements 808, and/or the quantity and/or size of overlap elements 808, may be increased in the simulated additively manufactured object 800, for example, by utilizing a relatively small layer height 816. For example, FIG. 9B shows an overlap element 808 at a location where in FIG. 9A there exists a void element 806.

As shown in FIG. 9C, the presence of void elements 806, and/or the quantity and/or size of void elements 806, in the simulated additively manufactured object 800 may be eliminated or reduced, for example, by utilizing a relatively small hatch width 810. Additionally, or in the alternative, the presence of overlap elements 808, and/or the quantity and/or size of overlap elements 808, may be increased in the simulated additively manufactured object 800, for example, by utilizing a relatively small hatch width 810. For example, FIG. 9C shows an overlap element 808 at a location where in FIG. 9A there exists a void element 806. By way of example, the overlap element in FIG. 9B includes four overlapping approximate consolidation domains.

In some embodiments, the presence of void elements 806 may depend at least in part on one or more irradiation parameters. The configuration and arrangement of the respective approximate consolidation domains 400 may depend at least in part on one or more irradiation parameters. For example, increasing beam power and/or decreasing scanning speed may increase one or more dimensions of an approximate consolidation domains 400, while decreasing beam power and/or increasing scanning speed may decrease one or more dimensions of an approximate consolidation domains 400. In various embodiments, any one or more irradiation parameters may influence one or more dimensional parameters of an approximate consolidation domains 400, including power, intensity, intensity profile, power density, spot size, spot shape, scanning pattern, scanning speed, and so forth. The particular influence may be determined using an irradiation parameter matrix 500.

As shown in FIG. 9D, by comparison to FIG. 9C, one or more irradiation parameters with irradiation parameter values that have the effect of decreasing one or more dimensions of an approximate consolidation domains 400 may increase the presence of void elements 806 and/or may decrease the presence of overlap elements 808. Additionally, or in the alternative, one or more irradiation parameters with irradiation parameter values that have the effect of decreasing one or more dimensions of an approximate consolidation domains 400 may increase the quantity and/or size of void elements 806, and/or may decrease the quantity and/or size of overlap elements 808. As shown in FIG. 9C, the presence of void elements 806, and/or the quantity and/or size of void elements 806, in the simulated additively manufactured object 800 may be eliminated or reduced relative to FIG. 9D, for example, by selecting irradiation parameter values so as to increase one or more dimensions of an approximate consolidation domains 400. Additionally, or in the alternative, the quantity and/or size of overlap elements may be increased relative to FIG. 9D, for example, by selecting irradiation parameter values so as to increase one or more dimensions of an approximate consolidation domains 400.

Referring now to FIGS. 10A-10E, further exemplary configurations and arrangements of approximate consolidation domains 400 that may be included in a simulated consolidation layer 802 and/or a simulated additively manufactured three-dimensional object 800 will be described. As shown in FIGS. 10A and 10B, in some embodiments, a simulated consolidation layer 802 and/or a simulated additively manufactured three-dimensional object 800 may include approximate consolidation domains 400 that share one or more common dimensional properties, such as one or more common geometric properties, one or more common algebraic properties, and/or one or more common statistical properties. For example, the approximate consolidation domains 400 may be defined at least in part by the same geometric shape. Additionally, or in the alternative, the approximate consolidation domains 400 may be defined at least in part by the same algorithm, such as the same curve fitting algorithm, the same algebraic fitting algorithm, and/or the same geometric fitting algorithm, or the like. The one or more dimensional properties of the approximate consolidation domains 400 in a simulated consolidation layer 802 and/or a simulated additively manufactured three-dimensional object 800 may be determined at least in part from data determined from an irradiation parameter matrix 500. For example, the approximate consolidation domain 400 may include an approximate consolidation boundary 402 that represents a mean, a median, or a mode determined at least in part from the irradiation parameter matrix 500.

In some embodiments, as shown in FIG. 10C, a simulated consolidation layer 802 and/or a simulated additively manufactured three-dimensional object 800 may include at least some approximate consolidation domains 400 that differ from one another in respect of one or more dimensional properties, such as one or more geometric properties, one or more algebraic properties, and/or one or more statistical properties. For example, at least some of the approximate consolidation domains 400 may be defined at least in part by a different geometric shape relative to one another. Additionally, or in the alternative, at least some of the approximate consolidation domains 400 may be defined at least in part by a different algorithm, such as a different curve fitting algorithm, a different algebraic fitting algorithm, and/or a different geometric fitting algorithm, or the like. The one or more dimensional properties of the approximate consolidation domains 400 in a simulated consolidation layer 802 and/or a simulated additively manufactured three-dimensional object 800 may be determined at least in part from data determined from an irradiation parameter matrix 500. For example, the approximate consolidation domains 400 may include an approximate consolidation boundary 402 that falls within a statistical confidence interval or range, such as a statistical variance and/or a standard deviation.

A plurality of approximate consolidation domains 400 may be determined for a simulated consolidation layer 802 and/or a simulated additively manufactured three-dimensional object 800 based at least in part on a statistical confidence interval or range, such as a statistical variance and/or a standard deviation. The plurality of approximate consolidation domains 400 may have one or more dimensional properties representative of a statistical confidence interval or range, such as a statistical variance and/or a standard deviation. For example, the plurality of approximate consolidation domains 400 may include one or more dimensional properties, such as one or more geometric properties, one or more algebraic properties, and/or one or more statistical properties, that are representative of a statistical confidence interval or range, such as a statistical variance and/or a standard deviation. The statistical confidence interval or range, such as a statistical variance and/or a standard deviation may be determined at least in part from data determined from an irradiation parameter matrix 500. The statistical confidence interval or range, such as a statistical variance and/or a standard deviation, may be utilized to determine one or more dimensional properties, such as a geometric shape, for a plurality of approximate consolidation domains 400. Additionally, or in the statistical confidence interval or range, such as a statistical variance and/or a standard deviation, may be utilized to determine a curve fitting algorithm, an algebraic fitting algorithm, and/or a geometric fitting algorithm, for a plurality of approximate consolidation domains 400.

In some embodiments, the presence of one or more simulated consolidation artifacts 804, such as void elements 806 and/or overlap elements 808, may be determined based at least in part on one or more dimensional properties, such as the geometric shape and/or a corresponding algorithm, of the plurality of approximate consolidation domains 400. Additionally, or in the alternative, the presence of one or more simulated consolidation artifacts 804 may be determined based at least in part on the configuration and arrangement of the plurality of approximate consolidation domains 400 in a simulated consolidation layer 802 and/or a simulated additively manufactured three-dimensional object 800. For example, the presence of simulated consolidation artifacts 804 may be determined based at least in part on the geometry of the approximate consolidation domains 400 and/or approximate consolidation boundaries 402, and/or their respective configuration and arrangements, such as a hatch width and/or a layer height. As another example, the presence of simulated consolidation artifacts 804 may be determined based at least in part on an algebraic property corresponding to the approximate consolidation domains 400 and/or approximate consolidation boundaries 402, and/or their respective configuration and arrangements. In some embodiments, the presence of simulated consolidation artifacts 804 may be determined based at least in part on a curve fitting algorithm, an algebraic fitting algorithm, and/or a geometric fitting algorithm. In some embodiments, a geometric shape, and/or a configuration and/or arrangement, of the approximate consolidation domains 400 may be determined from an irradiation parameter matrix 500, and the presence of one or more simulated consolidation artifacts 804 may be determined based at least in part on the geometric shape, and/or the configuration and/or arrangement, of the plurality of approximate consolidation domains 400.

By way of example, as shown in FIGS. 10A-10C, a geometric shape, and/or a configuration and arrangement, of approximate consolidation domains 400 may yield one or more void elements 806 and/or one or more overlap elements 808. Such void elements 806 may correspond to an increased probability for voids, pores, incomplete melting or sintering or non-sintered or non-melted powder material 120, or the like in the three-dimensional object 114. As shown in FIG. 10B, in some embodiments, a geometric shape, and/or a configuration and arrangement, of approximate consolidation domains 400 may yield one or more overlap elements 808, such as one or more overlap elements 808 with four overlapping approximate consolidation domains 400. By way of example, four overlapping approximate consolidation domains 400 may correspond to an increased probability for vaporization, sputtering, or the like during additive manufacturing, for example, attributable to excessive local temperature and/or temperature gradient, which may cause voids, pores, or the like in the three-dimensional object 114. As shown in FIG. 10C, one or more void elements 806 may be attributable at least in part to variation in the geometric shape, and/or variation in the configuration and/or arrangement, of approximate consolidation domains 400.

In some embodiments, a geometric shape, and/or a configuration and/or arrangement, of the approximate consolidation domains 400 may be determined based at least in part on a probability distribution. The probability distribution may be determined based at least in part on an irradiation parameter matrix 500. For example, as shown in FIG. 10C, a simulated consolidation layer 802 and/or a simulated additively manufactured three-dimensional object 800 may include at least some approximate consolidation domains 400 that differ from one another based at least in part on a probability distribution. The probability distribution may correspond to an irradiation parameter matrix 500. The difference represented by the probability distribution may correspond to one or more dimensional properties, such as one or more geometric properties, one or more algebraic properties, and/or one or more statistical properties. The presence of one or more simulated consolidation artifacts 804, such as void elements 806 and/or overlap elements 808, may be determined based at least in part on the geometric shape, and/or the configuration and/or arrangement, of the plurality of approximate consolidation domains 400 determined from the probability distribution. A distribution of the quantity and/or size of one or more simulated consolidation artifacts 804, such as void elements 806 and/or overlap elements 808, may be determined, for example, by quantifying the presence of the simulated consolidation artifacts 804 determined based at least in part on the geometric shape, and/or the configuration and/or arrangement, of the plurality of approximate consolidation domains 400. The simulated consolidation artifacts 804, and/or the distribution thereof, may depend at least in part on the probability distribution for the approximate consolidation domains 400 by virtue of the geometric shape, and/or the configuration and/or arrangement, of the approximate consolidation domains 400 being determined based at least in part on the probability distribution.

Additionally, or in the alternative, in some embodiments, a probability distribution for one or more simulation artifacts, such as void elements 806 and/or overlap elements 808, may be determined based at least in part on a probability for a geometric shape, and/or a probability for configuration and/or arrangement, of a plurality of approximate consolidation domains 400 in a simulated consolidation layer 802 and/or a simulated additively manufactured three-dimensional object 800. For example, FIGS. 10D and 10E shows probability maps for a geometric shape, and/or a configuration and arrangement, of plurality of approximate consolidation domains 400. The probability maps may represent a probable geometric shape, and/or a probable configuration and arrangement, of plurality of approximate consolidation domains 400. The probability maps may be based at least in part on a statistical confidence interval or range, such as a statistical variance and/or a standard deviation. The presence of one or more simulated consolidation artifacts 804, such as void elements 806 and/or overlap elements 808, may be determined based at least in part on the probability of respective approximate consolidation domains 400 having one or more dimensional properties, such as one or more geometric properties, one or more algebraic properties, and/or one or more statistical properties. For example, the presence of one or more simulated consolidation artifacts 804 may be determined based at least in part on the probability of respective approximate consolidation domains 400 having a given geometric shape, and/or the probability of respective approximate consolidation domains 400 having a given configuration and/or arrangement. As another example, the presence of one or more simulated consolidation artifacts 804 may be determined based at least in part on the probability of respective approximate consolidation domains 400 corresponding to a given algebraic property, such being described by a given equation. Additionally, or in the alternative, the presence of one or more simulated consolidation artifacts 804 may be determined based at least in part on the probability of respective approximate consolidation domains 400 corresponding to a given statistical property, such as a probability distribution. In some embodiments, a probability distribution may be determined for one or more simulated consolidation artifacts 804 in the simulated additively manufactured three-dimensional object 800, such as a probability distribution for the quantity and/or size of void elements 806 and/or overlap elements 808. In some embodiments, a probability distribution for the presence of one or more simulated consolidation artifacts 804 may be determined with respect to a statistical variance or standard deviation. Additionally, or in the alternative, a probability distribution for the presence of one or more simulated consolidation artifacts 804 may be determined with respect to a 1-sigma variance, a 2-sigma variance, a 3-sigma variance, or any other desired statistical variance.

In some embodiments, the presence of a simulated consolidation artifacts 804, such as a void element 806 and/or an overlap element 808, may be determined at a given location when the probability of the simulated consolidation artifact 804 at the given location falls within a probability range. As shown in FIG. 10D, a void element 806 may have a high probability of being present at a location as indicated. For example, a void element 806 may be present at the location indicated in FIG. 10D when the corresponding approximate consolidation boundaries 402 are located inside the 3-sigma outward approximate consolidation boundaries 608. The void element 806 may be present with a probability corresponding to the approximate consolidation boundaries 402 being located anywhere inside of the 3-sigma outward approximate consolidation boundaries 608. Conversely, an overlap element 808 may have a low probability of being present at a location as indicated. For example, an overlap element may be present at the location indicated in FIG. 10D when the corresponding approximate consolidation boundaries are located at the 3-sigma outward approximate consolidation boundaries 608 or further outward from the 3-sigma outward approximate consolidation boundaries 608. The overlap element 808 may be present with a probability corresponding to the approximate consolidation boundaries 402 being located at or outward from the 3-sigma outward approximate consolidation boundaries 608. In some embodiments, the probability of an overlap element 808 being located at a given position may be inversely proportional to the probability of a void element 806 being located at the given position, or vice versa.

As shown in FIG. 10E, a void element 806 may have a low probability of being present at a location as indicated. For example, a void element 806 may be present at the location indicated in FIG. 10D when the corresponding approximate consolidation boundaries 402 are located outside of the respective range defined by the respective 2-sigma outward approximate consolidation boundary 604 and the 2-sigma inward approximate consolidation boundary 606. The void element 806 may be present with a probability corresponding to the respective approximate consolidation boundaries 402 being located between the respective 2-sigma outward approximate consolidation boundary 604 and the 2-sigma inward approximate consolidation boundary 606. Conversely, an overlap element 808 may have a high probability of being present at a location as indicated. For example, an overlap element may be present at the location indicated in FIG. 10D when the corresponding approximate consolidation boundaries are located at a location from the respective 2-sigma outward approximate consolidation boundary 604 and the 2-sigma inward approximate consolidation boundary 606. The overlap element 808 may be present with a probability corresponding to the approximate consolidation boundaries 402 being located from the respective 2-sigma outward approximate consolidation boundary 604 to the 2-sigma inward approximate consolidation boundary 606. In some embodiments, the probability of an overlap element 808 being located at a given position may be inversely proportional to the probability of a void element 806 being located at the given position, or vice versa.

In some embodiments, one or more material properties of an actually additively manufactured object 114 may be determined based at least in part on a simulated additively manufactured three-dimensional object 800. A correlation may be determined between one or more material properties and a geometric shape of a plurality of approximate consolidation domains 400 and/or a configuration and arrangement of a plurality of approximate consolidation domains 400 in a simulated consolidation layer 802 and/or a simulated additively manufactured three-dimensional object 800. The correlation may be determined based at least in part on data from an irradiation parameter matrix 500. In some embodiments, a value for one or more material properties may be determined and/or predicted with reference to a probability, for example, based at least in part on the irradiation parameter matrix 500 and/or a simulated additively manufactured three-dimensional object 800. For example, a statistical inference may be determined for one or more material properties based at least in part on the irradiation parameter matrix 500 and/or a simulated additively manufactured three-dimensional object 800. Additionally, or in the alternative, a predictive inference may be determined for an additively manufactured object 114 that may be additively manufactured based at least in part on the simulated additively manufactured three-dimensional object 800. Exemplary material properties for which a statistical inference and/or a predictive inference may be determined include porosity, void sizes, void areas, void aspect ratios, density, elastic modulus, and the like. Further exemplary material properties for which a statistical inference and/or a predictive inference may be determined include grain structures and/or crystalline structures, such as coarse grain regions, microcrystalline grain regions, nanocrystalline grain regions, amorphous regions, precipitates, crystalline dislocations, twinning dislocations, and the like. Further exemplary material properties for which a statistical inference and/or a predictive inference may be determined include unmelted powder particles, unsintered powder particles, unbound binder particles, and the like.

Now turning to FIG. 11, an exemplary computing system 1100 will be described. The computing system 1100 may be included as part of an additive manufacturing machine 102 or additive manufacturing system 100, or the computing system 1100 may be separately or remotely located from an additive manufacturing machine 102 or additive manufacturing system 100. The computing system 1100 may be included as part of, or provided separately from, a control system 104 used to control an additive manufacturing machine 102 or additive manufacturing system 100. Regardless of where the computing system 1100 may be implemented, the computing system 1100 may be configured to perform one or more control operations. The computing system 1100 may be configured to perform one or more additive manufacturing simulations, including generating a simulated additively manufactured three-dimensional object 800, determining a statistical inference for one or more dimensional properties of the simulated additively manufactured three-dimensional object 800, and/or determining a predictive inference one or more material properties of an additively manufactured three-dimensional object 114 that may be manufactured based at least in part on the simulated additively manufactured three-dimensional object 800. The computing system 1100 may be configured to determine simulated consolidation artifacts 804 in a simulated consolidation layer 802 and/or a simulated additively manufactured three-dimensional object 800, such as void elements 806 and/or overlap elements 808. The predictive inference of the one or more material properties of the additively manufactured three-dimensional object 114 may be determined by the computing system 1100 based at least in part on one or more simulated consolidation artifacts 804.

A control system 104 and/or the computing system 1100 may be configured to output one or more control commands associated with an additive manufacturing machine 102. For example, a control system 104 may be configured to utilize the computing system 1100. The control commands may be configured to control one or more controllable components of an additive manufacturing machine 102. For example, the control system 104 may be configured to additively manufacture a three-dimensional object 114 based at least in part on an additive manufacturing simulation.

The computing system 1100 may be configured to generate a CAD file that includes a computer generated model of an object based at least in part on a simulated additively manufactured three-dimensional object 800. Additionally, or in the alternative, the computing system 1100 may be configured to generate a build file for additively manufacturing a three-dimensional object 114 based at least in part on a simulated additively manufactured three-dimensional object 800. The build file may include instructions based upon which the computing system 1100 may output control commands to an additive manufacturing machine 102 to additively manufacture the three-dimensional object 114. The control commands may be configured to cause the additive manufacturing machine to direct one or more energy beams to specified locations of a build plane 130 for selectively solidifying respective layers of an object 114.

Additionally, or in the alternative, the control commands may include setpoints for one or more irradiation parameters, such as power, intensity, intensity profile, power density, spot size, spot shape, scanning pattern, scanning speed, and so forth. In some embodiments, the computing system 1100 may be configured to determine one or more setpoints for one or more irradiation parameters based at least in part on an additive manufacturing simulation and/or a simulated additively manufactured three-dimensional object 800.

In some embodiments, a computing system 1100 may be configured to determine one or more digital representations 200, such as one or more micrographic images 201 of a three-dimensional object 114. Additionally, or in the alternative, a computing system 1100 may be configured to perform an additive manufacturing simulation based at least in part on the one or more digital representations 200, such as the one or more micrographic images 201. The computing system 1100 may be configured to determine one or more consolidation tracks 202, such as for a consolidation boundary 300, in a digital representation 200, such as a micrographic image 201, of a three-dimensional object 114. Additionally, or in the alternative, the control system may be configured to determine an approximate consolidation domain 400 corresponding to a consolidation track 202.

In some embodiments, a computing system 1100 may be configured to determine an irradiation parameter matrix 500, and/or to determine on one or more statistical parameters based at least in part on data from an irradiation parameter matrix 500. The computing system 1100 may be configured to determine one or more probability maps of approximate consolidation domains 400, for example, based at least in part on data from an irradiation parameter matrix 500. Additionally, or in the alternative, a computing system 1100 may be configured to determine one or more dimensional properties of a consolidation track 202 and/or of an approximate consolidation domain 400, such as a distribution of probable values for a given dimensional property.

Figure 11:
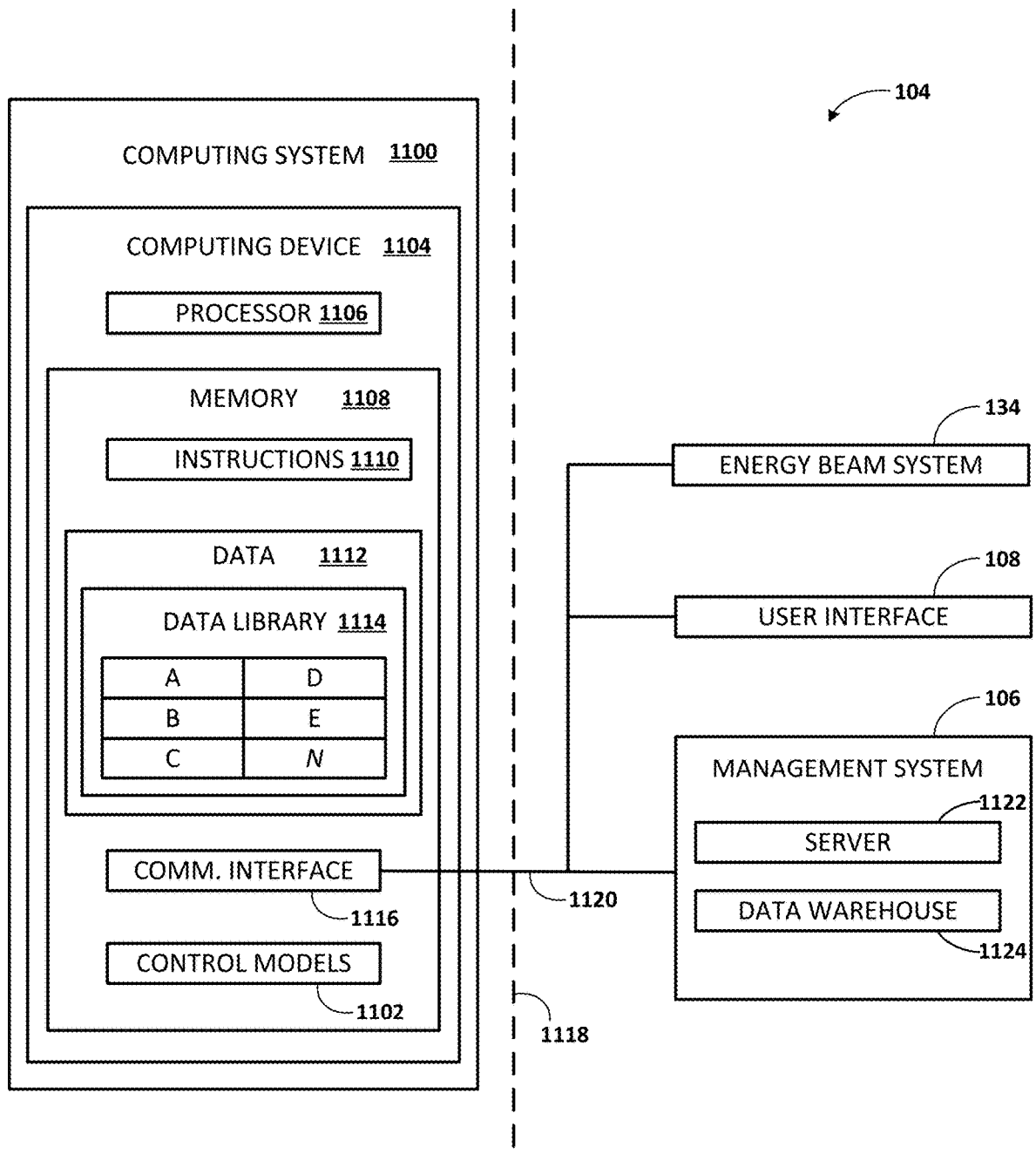
FIG. 11 schematically depicts an exemplary control system, such as for an additive manufacturing simulation and/or for an additive manufacturing machine or system.

As shown in FIG. 11, an exemplary computing system 1100 may include one or more control modules 1102 configured to cause the computing system 1100 to perform one or more control operations. The one or more control modules 1102 may include control logic executable to perform one or more operations assigned to the respective control module 1102.

For example, the one or more control modules 1102 may include an additive manufacturing simulation module 1200. An additive manufacturing simulation module 1200 may be configured as described herein with reference to FIG. 12. Additionally, or in the alternative, the one or more control modules 1102 may include an object design module 1400. An object design module 1400 may be configured as described herein with reference to FIG. 14. Additionally, or in the alternative, the one or more control modules 1102 may include an additive manufacturing module 1600. An additive manufacturing module 1600 may be configured as described herein with reference to FIG. 16.

The one or more control modules 1102 may include control logic executable to determine one or more irradiation parameters for an additive manufacturing machine 102, such as setpoints for one or more irradiation parameters, including, by way of example, power, intensity, intensity profile, power density, spot size, spot shape, scanning pattern, scanning speed, and so forth. Additionally, or in the alternative, the one or more control modules 1102 may include control logic executable to provide control commands configured to control one or more controllable components associated with an additive manufacturing machine 102, such as controllable components associated with an energy beam system 134 and/or a monitoring system 162. For example, a control module 1102 may be configured to provide one or more control commands based at least in part on one or more setpoints for one or more irradiation parameters.

The computing system 1100 may be communicatively coupled with an additive manufacturing machine 102. In some embodiments, the computing system 1100 may be communicatively coupled with one or more components of an additive manufacturing machine 102, such as one or more components of an energy beam system 134, and/or a monitoring system 162. The computing system 1100 may also be communicatively coupled with a management system 106 and/or a user interface 108.

The computing system 1100 may include one or more computing devices 1104, which may be located locally or remotely relative to the additive manufacturing machine 102 and/or the monitoring system 162. The one or more computing devices 1104 may include one or more processors 1106 and one or more memory devices 1108. The one or more processors 1106 may include any suitable processing device, such as a microprocessor, microcontroller, integrated circuit, logic device, and/or other suitable processing device. The one or more memory devices 1108 may include one or more computer-readable media, including but not limited to non-transitory computer-readable media, RAM, ROM, hard drives, flash drives, and/or other memory devices 1108.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 1108 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 1108 may store information accessible by the one or more processors 1106, including computer-executable instructions 1110 that can be executed by the one or more processors 1106. The instructions 1110 may include any set of instructions which when executed by the one or more processors 1106 cause the one or more processors 1106 to perform operations, including optical element monitoring operations, maintenance operations, cleaning operations, calibration operations, and/or additive manufacturing operations.

The memory devices 1108 may store data 1112 accessible by the one or more processors 1106. The data 1112 can include current or real-time data 1112, past data 1112, or a combination thereof. The data 1112 may be stored in a data library 1114. As examples, the data 1112 may include data 1112 associated with or generated by an additive manufacturing system 100 and/or an additive manufacturing machine 102, including data 1112 associated with or generated by the computing system 1100, an additive manufacturing machine 102, an energy beam system 134, a monitoring system 162, a management system 106, a user interface 108, and/or a computing device 1104. In some embodiments, the data 1112 may include data 1112 associated with one or more digital representations 200 (such as one or more micrographic images 201), data 1112 associated with an irradiation parameter matrix 500, and/or data associated with a simulated additively manufactured three-dimensional object 800, and/or data 1112 associated with an additive manufacturing simulation. Additionally, or in the alternative, the data 1112 may pertain to operation of an energy beam system 134 and/or a monitoring system 162. The data 1112 may also include other data sets, parameters, outputs, information, associated with an additive manufacturing system 100 and/or an additive manufacturing machine 102.

The one or more computing devices 1104 may also include a communication interface 1116, which may be used for communications with a communication network 1118 via wired or wireless communication lines 1120. The communication interface 1116 may include any suitable components for interfacing with one or more network(s), including for example, transmitters, receivers, ports, controllers, antennas, and/or other suitable components. The communication interface 1116 may allow the computing device 1104 to communicate with various nodes on the communication network 1118, such as nodes associated with the additive manufacturing machine 102, the energy beam system 134, the monitoring system 162, the management system 106, and/or a user interface 108. The communication network 1118 may include, for example, a local area network (LAN), a wide area network (WAN), SATCOM network, VHF network, a HF network, a Wi-Fi network, a WiMAX network, a gatelink network, and/or any other suitable communication network 1118 for transmitting messages to and/or from the computing system 1100 across the communication lines 1120. The communication lines 1120 of communication network 1118 may include a data bus or a combination of wired and/or wireless communication links.

The communication interface 1116 may allow the computing device 1104 to communicate with various components of an additive manufacturing system 100 and/or an additive manufacturing machine 102 communicatively coupled with the communication interface 1116 and/or communicatively coupled with one another, including an energy beam system 134 and/or a monitoring system 162. The communication interface 1116 may additionally or alternatively allow the computing device 1104 to communicate with the management system 106 and/or the user interface 108. The management system 106 may include a server 1122 and/or a data warehouse 1124. As an example, at least a portion of the data 1112 may be stored in the data warehouse 1124, and the server 1122 may be configured to transmit data 1112 from the data warehouse 1124 to the computing device 1104, and/or to receive data 1112 from the computing device 1104 and to store the received data 1112 in the data warehouse 1124 for further purposes. The server 1122 and/or the data warehouse 1124 may be implemented as part of a computing system 1100, as part of a control system 104, and/or as part of the management system 106.

Figure 12:
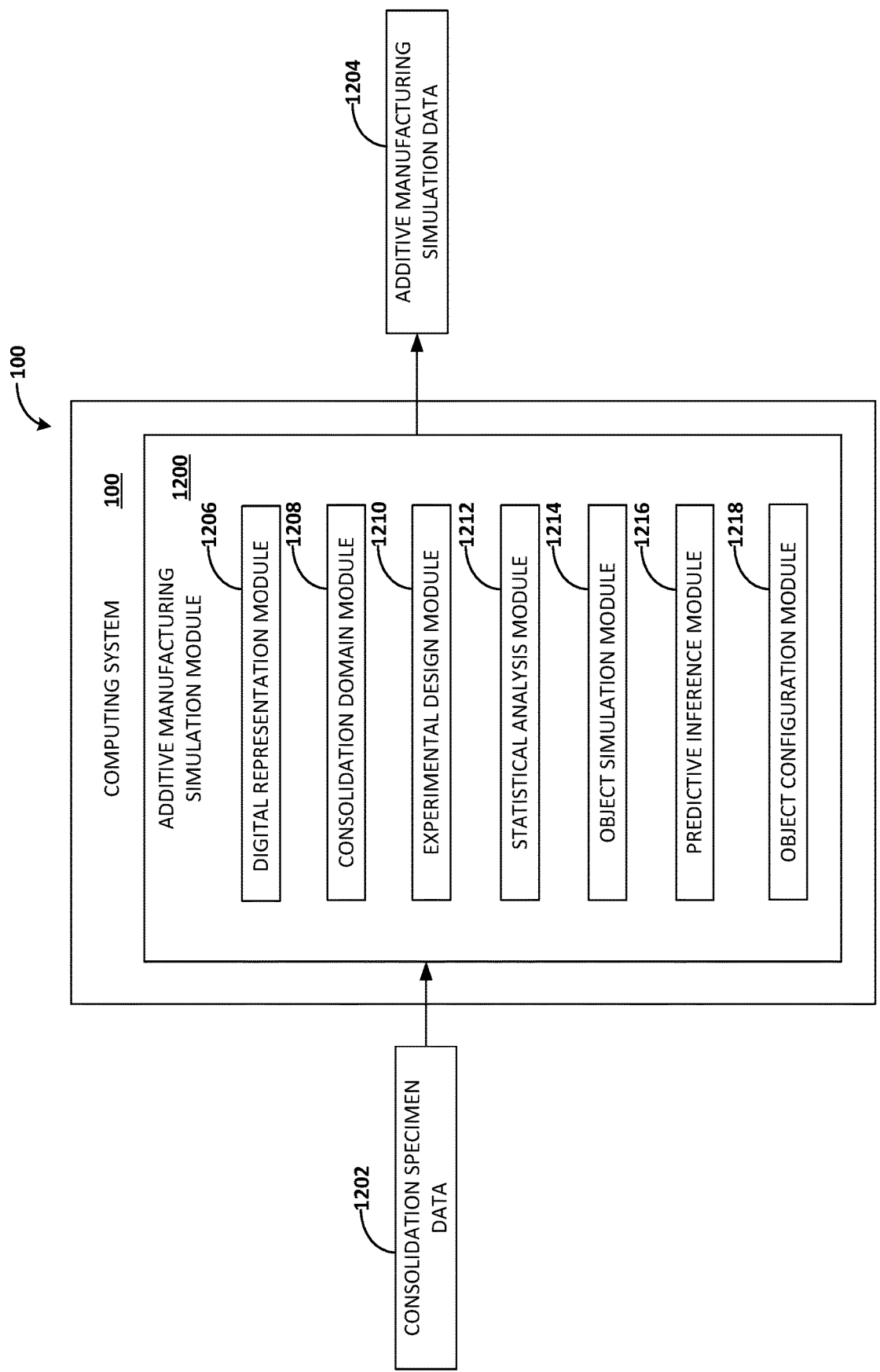
FIG. 12 schematically depicts an exemplary additive manufacturing simulation module, such as for simulating additively manufacturing a three-dimensional object.

FIG. 12 schematically depicts an exemplary additive manufacturing simulation module 1200. An additive manufacturing simulation module 1200 may be configured to perform an additive manufacturing simulation. An additive manufacturing simulation module 1200 may be implemented by a computing system 1100 provides as part of, or provided separately from, an additive manufacturing machine 102 or additive manufacturing system 100. For example, a computing system 1100 used to perform an additive manufacturing simulation may be separate from, or integrated with, a control system 104 associated with an additive manufacturing machine 102 and/or associated with an additive manufacturing system 100.

As shown in FIG. 12, an additive manufacturing simulation module 1200 may be configured to perform an additive manufacturing simulation based at least in part on consolidation specimen data 1202. The consolidation specimen data 1202 may include one or more digital representations 200, such as one or more micrographic images 201, of one or more three-dimensional objects 114 and/or data pertaining thereto. The additive manufacturing simulation data 1204 may include a simulated additively manufactured three-dimensional object 800. The additive manufacturing simulation performed by the additive manufacturing simulation module 1200 may include outputting additive manufacturing simulation data 1204. For example, the additive manufacturing simulation data 1204 may be output to an object design module as described herein with reference to FIG. 14 and/or an additive manufacturing module as described herein with reference to FIG. 16.

In some embodiments, an additive manufacturing simulation module 1200 may include a digital representation module 1206, such as a micrographic imaging module. The digital representation module 1206 may be configured to determine the consolidation specimen data 1202, for example, as described with reference to FIG. 2. The consolidation specimen data 1202 may be stored in a data library 1114 and/or a data warehouse 1124 as described with reference to FIG. 11. Additionally, or in the alternative, the digital representation module 1206 may be configured to cause an imaging system 203 to acquire consolidation specimen data 1202, such as one or more digital representations 200 (e.g., micrographic images 201) of a three-dimensional object 114 and/or data 1112 pertaining thereto. The digital representation module 1206 may be configured to cause the imaging system 203 to provide the consolidation specimen data 1202 for use in one or more operations performed by the digital representation module 1206.

In some embodiments, an additive manufacturing simulation module 1200 may include a consolidation domain module 1208. The consolidation domain module 1208 may be configured to determine one or more consolidation tracks 202, such as for corresponding consolidation boundaries 300, for example, as described with reference to FIGS. 3A-3C. The consolidation domain module 1208 may determine the one or more consolidation tracks 202 from consolidation specimen data 1202 and/or from one or more digital representations 200, such as one or more micrographic images 201. Additionally, or in the alternative, consolidation domain module 1208 may be configured to determine one or more approximate consolidation domains 400 and/or one or more approximate consolidation boundaries 402, for example, as described with reference to FIGS. 4A-4C. The consolidation domain module 1208 may determine the one or more approximate consolidation domains 400 and/or the one or more approximate consolidation boundaries 402 from the consolidation specimen data 1202 and/or from the one or more digital representations 200 (e.g., micrographic images 201). The one or more approximate consolidation domains 400 and/or corresponding approximate consolidation boundaries 402 may respectively correspond to the one or more consolidation tracks 202 and/or corresponding consolidation boundaries 300.

In some embodiments, an additive manufacturing simulation module 1200 may include an experimental design module 1210. The experimental design module 1210 may be configured to determine an experimental design for generating data for an additive manufacturing simulation. In some embodiments, the experimental design module 1210 may be configured to develop an irradiation parameter matrix 500, for example, as described with reference to FIG. 5. For example, the experimental design module 1210 may be configured to determine a plurality of nodes 502 that define respective irradiation parameter values to be utilized when forming the consolidation track 202 corresponding to the respective node 502. The experimental design module 1210 may be configured to cause an additive manufacturing machine 102 to additively manufacture three-dimensional objects 114 corresponding to the experimental design and/or the irradiation parameter matrix 500.

In some embodiments, an additive manufacturing simulation module 1200 may include a statistical analysis module 1212. The statistical analysis module 1212 may be configured to determine one or more statistical parameters corresponding to additively manufactured three-dimensional objects 114 and/or simulated additively manufactured three dimensional objects 800. For example, the statistical analysis module 1212 may determine one or more statistical parameters based at least in part on data from an irradiation parameter matrix 500. Additionally, or in the alternative, the statistical analysis module 1212 may determine one or more statistical inferences based at least in part on data from an irradiation parameter matrix 500. In some embodiments, the statistical analysis module 1212 may determine probability maps of approximate consolidation domains 400 as described herein with reference to FIGS. 6A-6C. Additionally, or in the alternative, the statistical analysis module 1212 may determine one or more dimensional properties of consolidation tracks 202 and/or approximate consolidation domains 400, such as a statistical inference with respect thereto, as described herein with reference to FIGS. 7A-7C.

In some embodiments, the statistical analysis module 1212 may determine a probability distribution for a geometric shape, and/or for a configuration and/or arrangement, of the approximate consolidation domains 400, for example, as described herein with reference to FIGS. 8A-8E, 9A-9D, and 10A-10E. In some embodiments, the statistical analysis module 1212 may determine a probability distribution of one or more simulated consolidation artifacts 804, for example, as described herein with reference to FIG. 8E. Additionally, or in the alternative, the statistical analysis module 1212 may determine a probability distribution for at least some approximate consolidation domains 400 that differ from one another based at least in part on, for example, as described herein with reference to FIG. 10C. Additionally, or in the alternative, the statistical analysis module 1212 may determine one or more probability maps for a geometric shape, and/or a configuration and arrangement, of plurality of approximate consolidation domains 400, for example, as described with reference to FIGS. 10D and 10E.

In some embodiments, an additive manufacturing simulation module 1200 may include an object simulation module 1214. The object simulation module 1214 may be configured to generate a simulated an additively manufactured three-dimensional object 800, for example, as described herein with reference to FIGS. 8A-8E, 9A-9D, and 10A-10E. The object simulation module 1214 may generate a simulated an additively manufactured three-dimensional object 800 using one or more of the modules described herein, such as one or more of the modules described with reference to the additive manufacturing simulation module 1200. In some embodiments, the object simulation module 1214 may determine one or more dimensional properties of, and/or a configuration and arrangement of, simulated consolidation layers 802, as described, for example, with reference to FIGS. 8A-8C and 9A-9D. Additionally, or in the alternative, an object simulation module 1214 may determine one or more dimensional properties of, and/or a configuration and arrangement of, approximate consolidation domains 400 included in respective simulated consolidation layers 802, for example, using a computer vision program as described herein. Additionally, or in the alternative, an object simulation module 1214 may determine one or more simulation simulated consolidation artifacts 804, for example, using a computer vision program as described herein.

In some embodiments, an additive manufacturing simulation module 1200 may include a predictive inference module 1216. The predictive inference module 1216 may be configured to determine a predictive inference of one or more material properties of a three-dimensional object 114 that may be additively manufactured based at least in part on a simulated additively manufactured three-dimensional object 800. For example, the predictive inference module 1216 may determine a predictive inference as to porosity, void sizes, void area, void aspect ratio, void maximum size, density, elastic modulus, yield strength, ductility, hardness, surface finish, mass, fatigue limit, creep, and the like. Additionally, or in the alternative, exemplary material properties for which a predictive inference module 1216 may determine a predictive inference include grain structures and/or crystalline structures of a three-dimensional object 114 that may be additively manufactured based at least in part on a simulated additively manufactured three-dimensional object 800. Exemplary grain structures and/or crystalline structures for which a predictive inference may be determined include coarse grain structures, microcrystalline grain structures, nanocrystalline grain structures, amorphous regions, precipitates, crystalline dislocations, twinning dislocations, and the like. Further exemplary material properties for which a predictive inference module 1216 may determine a predictive inference include unmelted powder particles, unsintered powder particles, unbound binder particles, and the like.

In some embodiments, an additive manufacturing simulation module 1200 may include an object configuration module 1218. An object configuration module 1218 may be configured to determine an object configuration, such as one or more dimensional properties, of an object 114 to be simulated in an additive manufacturing simulation and/or in a simulated additively manufactured three-dimensional object 800. For example, an object configuration module 1218 may determine an object configuration from a CAD file for an object. Additionally, or in the alternative, an object configuration module 1218 may determine an object configuration from an object design module 1400 as described herein with reference to FIG. 14.

Figure 13:
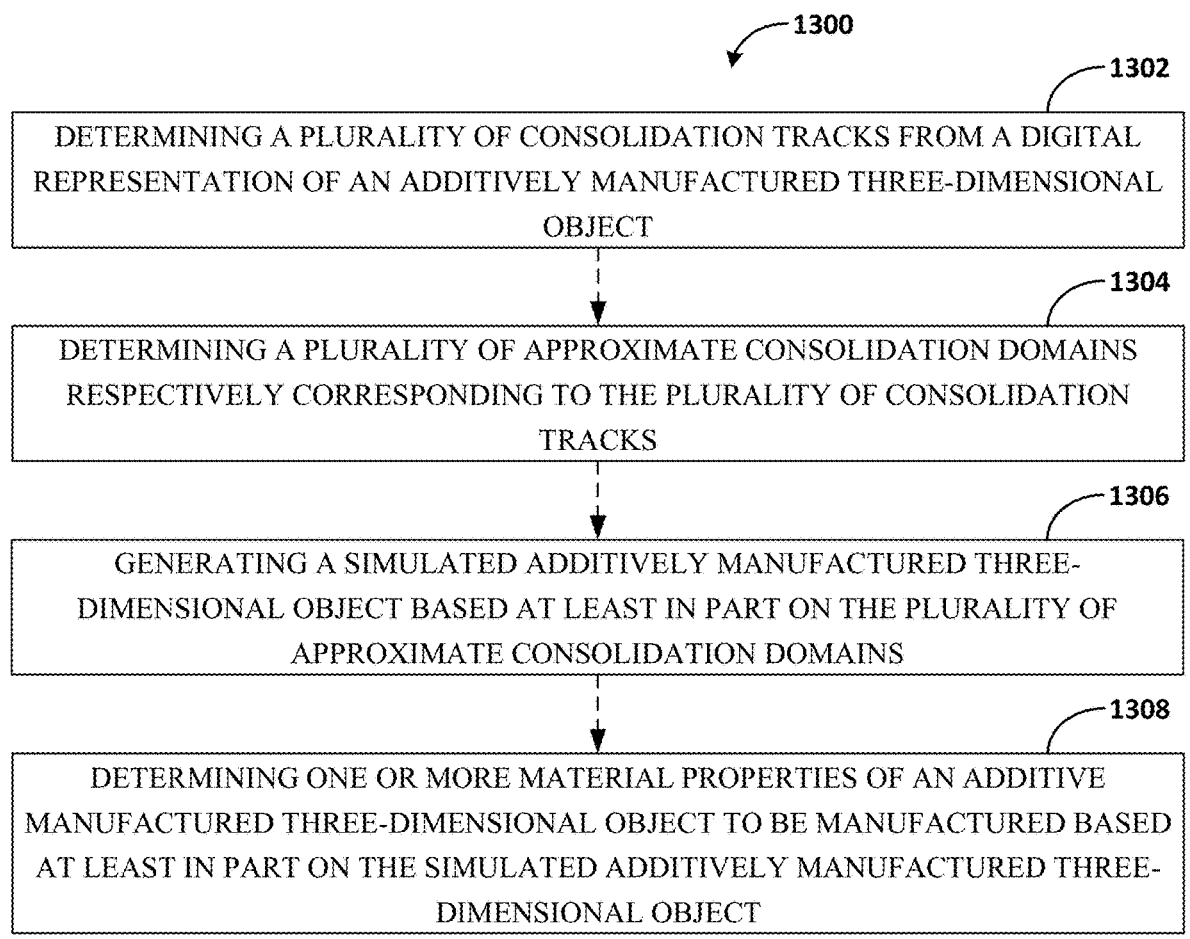
FIG. 13 shows a flow chart depicting an exemplary method of simulating additively manufacturing a three-dimensional object.

Now turning to FIG. 13, an exemplary method 1300 of simulating additively manufacturing a three-dimensional object will be described. Exemplary methods 1300 of simulating additively manufacturing a three-dimensional object may be performed using an additive manufacturing simulation module 1200. Exemplary methods 1300 of simulating additively manufacturing a three-dimensional object may include any one or more operations for which an additive manufacturing simulation module 1200 may be configured. In some embodiments, an exemplary method 1300 may include, at block 1302, determining a plurality of consolidation tracks 202 from a digital representation 200 of an additively manufactured three-dimensional object 114. At block 1304, an exemplary method 1300 may include determining a plurality of approximate consolidation domains 400 respectively corresponding to the plurality of consolidation tracks 400. An exemplary method 1300 may include, at block 1306, generating a simulated additively manufactured three-dimensional object 800 based at least in part on the plurality of approximate consolidation domains 400. At block 1308, an exemplary method 1300 may include determining one or more material properties of a three-dimensional object 114 to be additively manufactured based at least in part on the simulated additively manufactured three-dimensional object.

Figure 15:
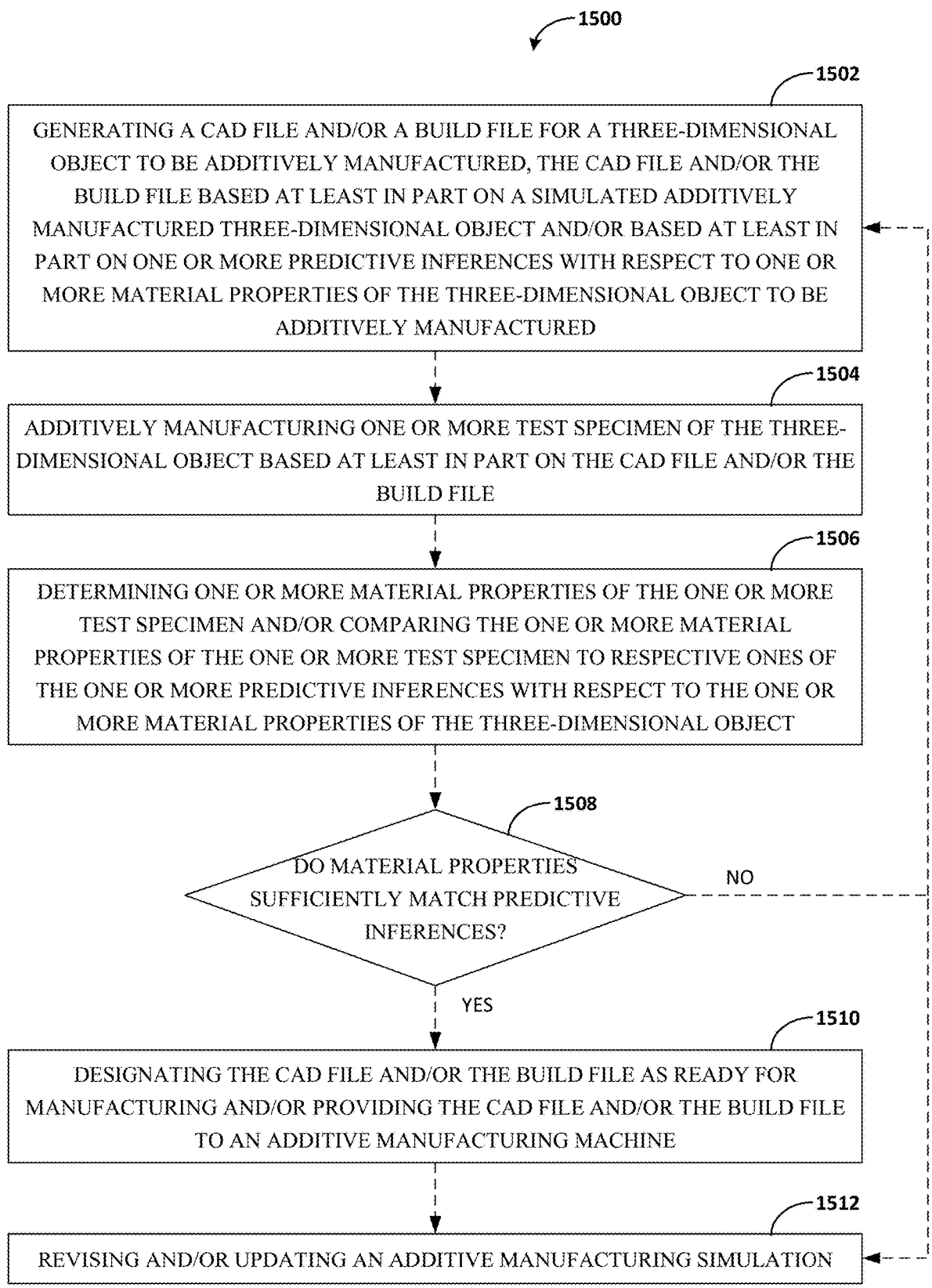
FIG. 15 shows a flow chart depicting an exemplary method of designing an additively manufactured a three-dimensional object.

An exemplary method 1300 may include designing a three-dimensional object to be additively manufactured, for example, as described with reference to FIG. 15. In some embodiments, the three-dimensional object may be designed based at least in part on a simulated additively manufactured three-dimensional object and/or based at least in part on one or more predictive inferences with respect to one or more material properties of the three-dimensional object to be additively manufactured. Additionally, or in the alternative, an exemplary method 1300 may include additively manufacturing a three-dimensional object, for example, as described with reference to FIG. 17. In some embodiments, the three-dimensional object may be additively manufactured based at least in part on a simulated additively manufactured three-dimensional object and/or based at least in part on one or more predictive inferences with respect to one or more material properties of the three-dimensional object to be additively manufactured.

Figure 14:
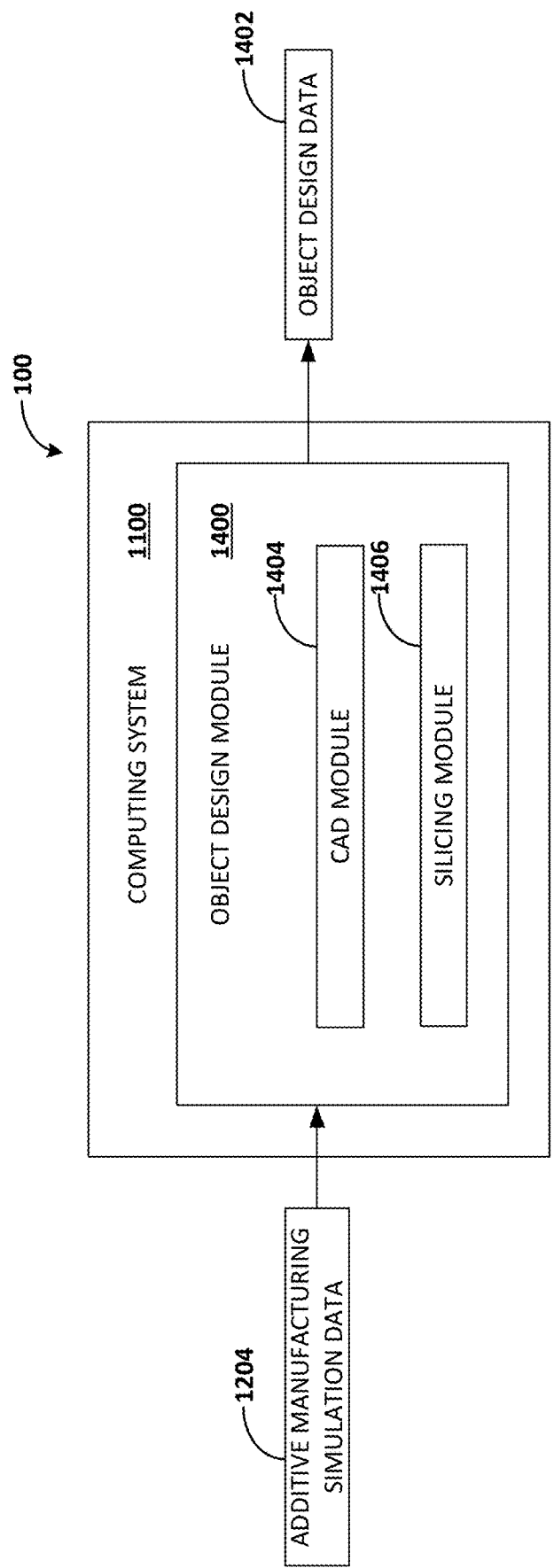
FIG. 14 schematically depicts an exemplary object design module, such as for designing an additively-manufactured three-dimensional object.

Referring now to FIG. 14, an exemplary object design module 1400 will be described. An object design module 1400 may be configured to perform one or more operations associated with designing an object 114 to be additively manufactured.

An object design module 1400 may be implemented by a computing system 1100 provides as part of, or provided separately from, an additive manufacturing machine 102 or additive manufacturing system 100. For example, a computing system 1100 used to perform one or more operations associated with designing an object 114 to be additively manufactured may be separate from, or integrated with, a control system 104 associated with an additive manufacturing machine 102 and/or associated with an additive manufacturing system 100.

As shown in FIG. 14, an object design module 1400 may be configured to generate object design data 1402. The object design data 1402 may be generated based at least in part on additive manufacturing simulation data 1204. The additive manufacturing simulation data 1204 may be determined from a data library 1114 and/or a data warehouse 1124. Additionally, or in the alternative, the additive manufacturing simulation data 1204 may be determined from an additive manufacturing simulation module 1200.

In some embodiments, an object design module 1400 may include a CAD module 1404. An exemplary CAD module 1404 may be configured to generate a CAD file that includes a CAD model of an object 114 to be additively manufactured. The object design data 1402 may include one or more CAD files and/or one or more CAD models generated by the CAD module 1404. A CAD file and/or a CAD model may be generated by the CAD module 1404 based at least in part on additive manufacturing simulation data 1204. For example, a CAD file and/or a CAD model may be generated by the CAD module 1404 based at least in part on a simulated additively manufactured three-dimensional object 800. The CAD file may include one or more CAD models that provide a three-dimensional representation of an object 114 to be additively manufactured based at least in part on a simulated additively manufactured three-dimensional object 800. In some embodiments, a simulated additively manufactured three-dimensional object 800 may be determined based at least in part on an initial CAD file that includes one or more initial CAD model for an object 114 to be additively manufactured. Additionally, or in the alternative, an initial CAD file and/or an initial CAD model may be augmented based at least in part on a simulated additively manufactured three-dimensional object 800. For example, an augmented CAD file and/or an augmented CAD model may be generated from an initial CAD file and/or an initial CAD model based at least in part on a simulated additively manufactured three-dimensional object 800.

In some embodiments, an object design module 1400 may include a slicing module 1406. An exemplary slicing module 1406 may be configured to generate a build file that defines build instructions for an additive manufacturing machine to additively manufacture a three-dimensional object 114. The build instructions may include slicing data, such as data that defines a plurality of slices collectively representing a three-dimensional object 114 and/or a plurality of slicing parameters pertaining thereto. Additionally, or in the alternative, the build instructions may include irradiation parameters for irradiating respective layers of powder material 120 to additively manufacture the three-dimensional object 114. The plurality of slices may correspond to respective layers of powder material. The irradiation parameters may include, by way of example, power, intensity, intensity profile, power density, spot size, spot shape, scanning pattern, scanning speed, and so forth.

The object design data 1402 may include one or more build files generated by the slicing module 1406. A build file may be generated by the slicing module 1406 based at least in part on additive manufacturing simulation data 1204. Additionally, or in the alternative, a build file may be generated by the slicing module 1406 based at least in part on a CAD file and/or a CAD model, such as a CAD file and/or a CAD model generated by the CAD module 1404. A build file may be generated by the slicing module 1406 based at least in part on a simulated additively manufactured three-dimensional object 800. The build file may include one or more build instructions, including, for example, slicing data and/or irradiation parameters, for additively manufacturing a three-dimensional object 114 based at least in part on a simulated additively manufactured three-dimensional object 800. In some embodiments, a simulated additively manufactured three-dimensional object 800 may be determined based at least in part on an initial build file that includes slicing data and/or irradiation parameters for an object 114 to be additively manufactured. Additionally, or in the alternative, an initial build file may be augmented based at least in part on a simulated additively manufactured three-dimensional object 800. For example, an augmented build file may be generated from an initial build file based at least in part on a simulated additively manufactured three-dimensional object 800. The augmented build file may include, for example, augmented slicing data and/or augmented irradiation parameters determined, for example, based at least in part on a simulated additively manufactured three-dimensional object 800.

Now turning to FIG. 15, exemplary method 1500 of designing a three-dimensional object 114 to be additively manufactured will be described. Exemplary methods 1500 of designing a three-dimensional object 114 may be performed using an object design module 1400. Exemplary methods 1500 of designing a three-dimensional object may include any one or more operations for which an object design module 1400 may be configured. In some embodiments, an exemplary method 1500 may include, at block 1502, generating a CAD file and/or a build file for a three-dimensional object to be additively manufactured. The CAD file and/or the build file may be based at least in part on a simulated additively manufactured three-dimensional object 800. Additionally, or in the alternative, the CAD file and/or the build file may be based at least in part on a predictive inference with respect to one or more material properties of the three-dimensional object.

In some embodiments, an exemplary method 1500 may include, at block 1504, additively manufacturing one or more test specimen of the three-dimensional object based at least in part on the CAD file and/or the build file. The one or more test specimen may be additively manufactured using one or more different additive manufacturing machines 102 and/or additive manufacturing systems 100. For example, the one or more test specimen may be additively manufactured at least in part to determine whether an additive manufacturing machine 102 and/or additive manufacturing system 100 yields an additively manufactured three-dimensional object 114 with one or more material properties that are as expected and/or suitable, such as with respect to one or more quality and/or productivity metrics. Additionally, or in the alternative, the one or more test specimen may be additively manufactured using one or more different irradiation devices 138, 140 and/or one or more different energy beams 142, 148 with respect to all or a portion of a respective test specimen, for example, to determine whether the respective irradiation devices 138, 140 and/or energy beams 142, 148 yields an additively manufactured three-dimensional object 114 with one or more material properties that are as expected and/or suitable, such as with respect to one or more quality and/or productivity metrics.

At block 1506, an exemplary method 1500 may include determining one or more material properties of the one or more test specimen and/or comparing the one or more material properties of the one or more test specimen to respective ones of the one or more predictive inferences with respect to the one or more material properties of the three-dimensional object. For example, at block 1508, an exemplary method may include determining whether the one or more material properties of the one or more test specimen sufficiently match the respective ones of the one or more predictive inferences. At block 1510, when the one or more material properties sufficiently match the respective ones of the one or more predictive inferences, an exemplary method 1500 may include designating the CAD file and/or the build file as ready for manufacturing and/or providing the CAD file and/or the build file to an additive manufacturing machine, such as to additively manufacture the three-dimensional object 114.

When the one or more material properties do not sufficiently match the respective ones of the one or more predictive inferences at block 1508, an exemplary method 1500 may include, at block 1512, revising and/or updating an additive manufacturing simulation. Revising and/or updating an additive manufacturing simulation may include generating a revised and/or updated simulated additively manufactured three-dimensional object and/or determining a revised and/or updated predictive inference with respect to one or more material properties of a three-dimensional object to be additively manufactured based at least in part on the revised and/or updated simulated additively manufactured three-dimensional object. Additionally, or in the alternative, when the one or more material properties do not sufficiently match the respective ones of the one or more predictive inferences at block 1508, an exemplary method 1500 may return to block 1502, and generate a revised CAD file and/or build file for the three-dimensional object to be additively manufactured. The revised CAD file and/or the revised build file may be based at least in part on the one or more material properties of the one or more test specimen. Additionally, or in the alternative, the revised CAD file and/or the revised build file may be based at least in part on the comparison of the one or more material properties of the one or more test specimen to respective ones of the one or more predictive inferences.

Figure 17:
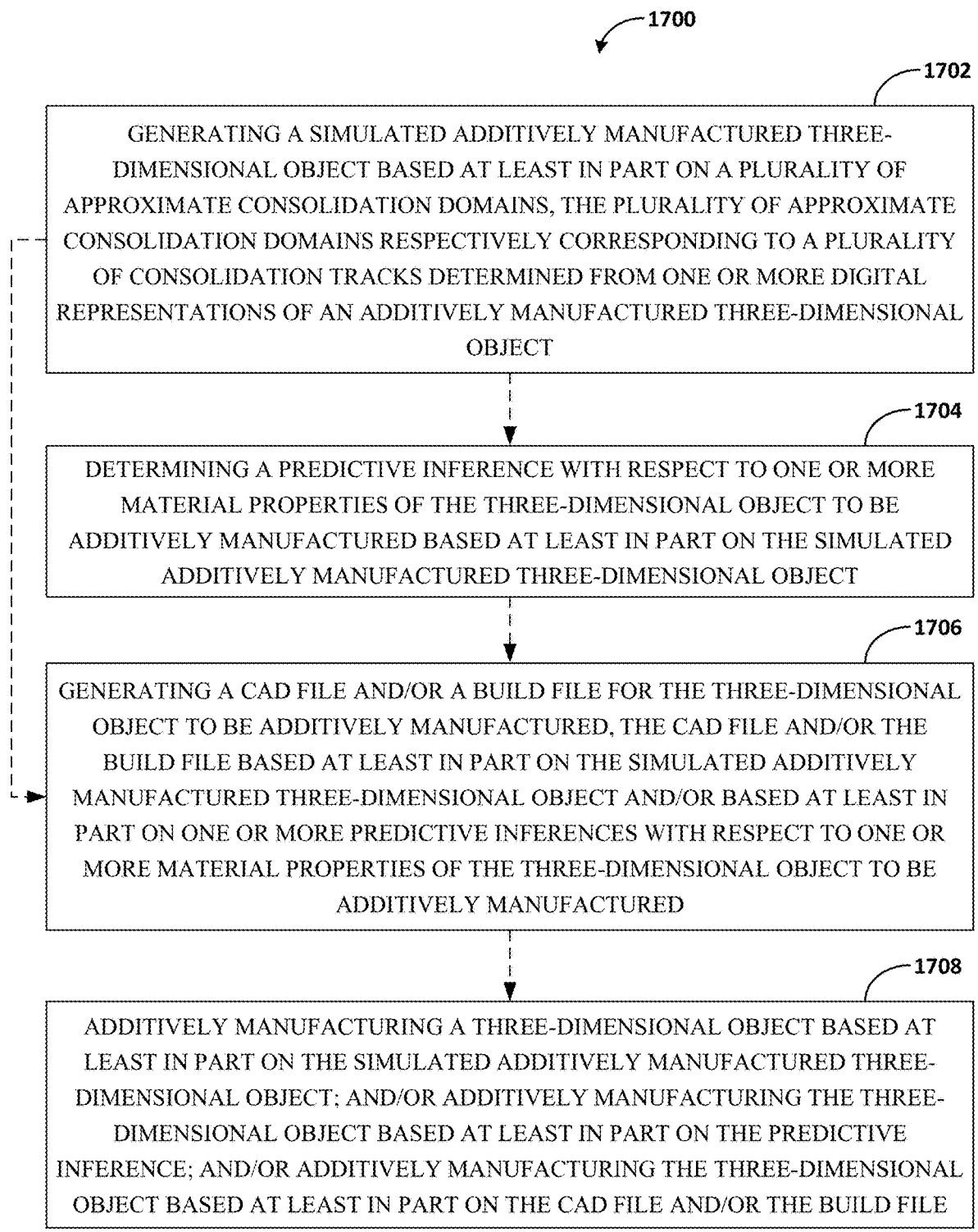
FIG. 17 shows a flow chart depicting an exemplary method of additively manufacturing a three-dimensional object.

In some embodiments, an exemplary method 1500 may include additively manufacturing a three-dimensional object, for example, as described with reference to FIG. 17. The three-dimensional object may be additively manufactured based at least in part on a simulated additively manufactured three-dimensional object and/or based at least in part on one or more predictive inferences with respect to one or more material properties of the three-dimensional object to be additively manufactured.

Figure 16:
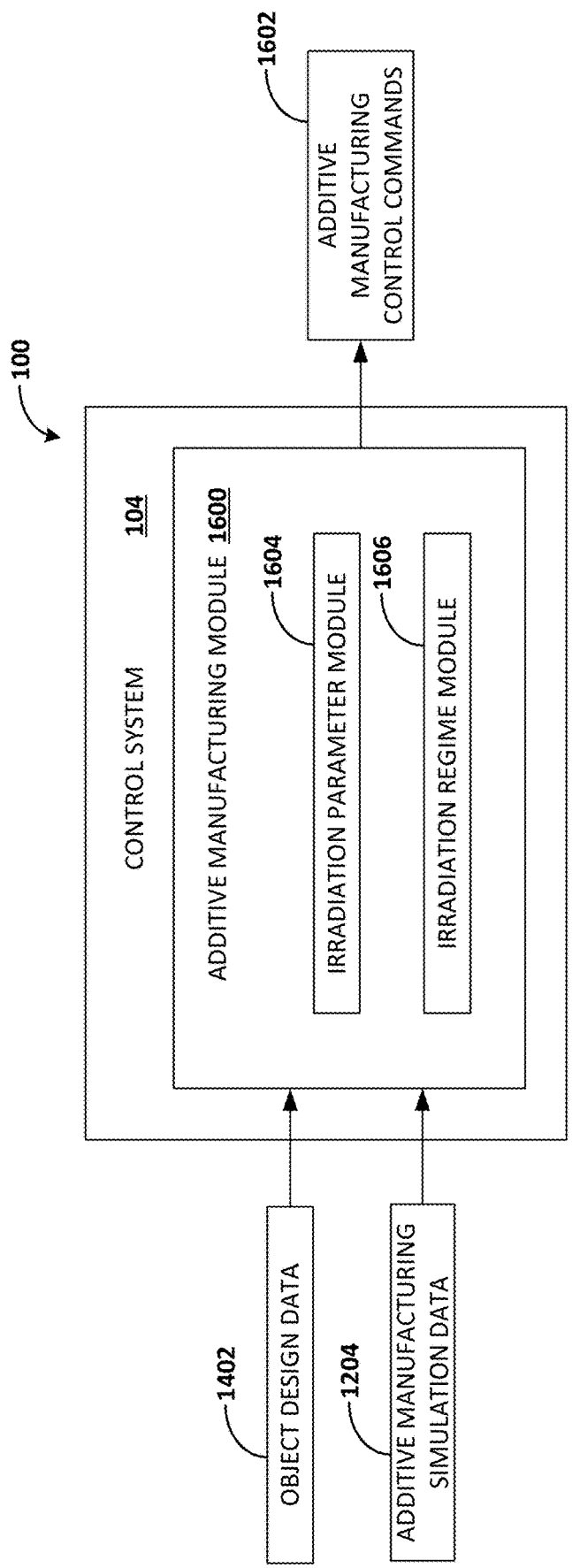
FIG. 16 schematically depicts an exemplary additive manufacturing module, such as for additively-manufacturing a three-dimensional object.

Now turning to FIG. 16, an exemplary additive manufacturing module 1600 will be described. An additive manufacturing module 1600 may be configured to perform one or more additive manufacturing operations using an additive manufacturing machine 102. For example, as shown in FIG. 16, an additive manufacturing module 1600 may be configured to generate control commands for an additive manufacturing machine 102, such as to additively manufacture a three-dimensional object 114. The control commands may be generated based at least in part on object design data 1402 and/or based at least in part on additive manufacturing simulation data 1204. The additive manufacturing module 1600 may be configured to generate additive manufacturing control commands 1602.

In some embodiments, an additive manufacturing module 1600 may include an irradiation parameter module 1604. An irradiation parameter module 1604 may be configured to determine one or more irradiation parameters for additively manufacturing a three-dimensional object 114. Additionally, or in the alternative, an irradiation parameter module 1604 may be configured to generate additive manufacturing control commands 1602, such as control commands configured to control the one or more irradiation parameters for additively manufacturing the three-dimensional object 114. Exemplary irradiation parameters that may be determined and/or controlled may include, by way of example, power, intensity, intensity profile, power density, spot size, spot shape, scanning pattern, scanning speed, and so forth.

In some embodiments, an additive manufacturing module 1600 may include an irradiation regime module 1606. An irradiation regime module 1606 may be configured to determine an irradiation regime for additively manufacturing the three-dimensional object 114. For example, an irradiation regime module 1606 may determine an allocation of one or more three-dimensional objects 114, and/or one or more regions thereof, as between respective ones of a plurality of irradiation devices 138, 140 and/or as between respective ones of a plurality of energy beams 142, 148.

Now turning to FIG. 17, exemplary methods 1700 of additively manufacturing a three-dimensional object will be described. Exemplary methods 1700 of additively manufacturing a three-dimensional object may be performed using an additive manufacturing module 1600. Exemplary methods 1700 of additively manufacturing a three-dimensional object 114 may include any one or more operations for which an additive manufacturing module 1600 may be configured. In some embodiments, an exemplary method 1700 may include, at block 1702, generating a simulated additively manufactured three-dimensional object 800 based at least in part on a plurality of approximate consolidation domains 400. The plurality of approximate consolidation domains 400 may respectively correspond to a plurality of consolidation tracks 202 determined from one or more digital representations 200, such as micrographic images 201, of an additively manufactured three-dimensional object 114. At block 1704, an exemplary method 1700 may include determining a predictive inference with respect to one or more material properties of the three-dimensional object 114 to be additively manufactured. The predictive inference may be based at least in part on the simulated additively manufactured three-dimensional object 800. Additionally, or in the alternative, at block 1706, an exemplary method 1700 may include generating a CAD file and/or a build file for the three-dimensional object 114 to be additively manufactured. The CAD file and/or the build file may be based at least in part on the simulated additively manufactured three-dimensional object 800 and/or based at least in part on one or more predictive inferences with respect to one or more material properties of the three-dimensional object 114 to be additively manufactured. The exemplary method 1700 may include, at block 1708, additively manufacturing the three-dimensional object 114 based at least in part on the simulated additively manufactured three-dimensional object 800. Additionally, or in the alternative, block 1708 may include additively manufacturing the three-dimensional object 114 based at least in part on the predictive inference. Additionally, or in the alternative, block 1708 may include additively manufacturing the three-dimensional object 114 based at least in part on the CAD file and/or the build file.

Further aspects of the invention are provided by the subject matter of the following clauses:

1. A method of simulating additively manufacturing a three-dimensional object, the method comprising: generating a simulated additively manufactured three-dimensional object based at least in part on a plurality of approximate consolidation domains, the plurality of approximate consolidation domains respectively corresponding to a plurality of consolidation tracks determined from one or more digital representations of an additively manufactured three-dimensional object; and determining a predictive inference with respect to one or more material properties of a three-dimensional object to be additively manufactured based at least in part on the simulated additively manufactured three-dimensional object.

2. The method of any clause herein, comprising: determining the plurality of approximate consolidation domains based at least in part on the plurality of consolidation tracks.

3. The method of any clause herein, comprising: determining the plurality of approximate consolidation domains based at least in part on a curve fitting algorithm and/or based at least in part on a data library that includes a plurality of geometric approximation candidates.

4. The method of any clause herein, comprising: selecting a geometric approximation candidate from among the plurality included in the data library based at least in part on a comparison of one or more of the plurality of geometric approximation candidates to one or more of the plurality of approximate consolidation domains.

5. The method of any clause herein, comprising: determining the plurality of approximate consolidation domains based at least in part on a geometric approximation candidate selected from the data library using a comparison algorithm.

6. The method of any clause herein, wherein the plurality of consolidation tracks correspond to a melt pool domain, a sintering domain, or a reaction domain.

7. The method of any clause herein, wherein the plurality of approximate consolidation domains comprises an approximate consolidation boundary.

8. The method of any clause herein, wherein the one or more digital representations comprises one or more micrographic images.

9. The method of any clause herein, comprising: determining the plurality of consolidation tracks, wherein determining the plurality of consolidation tracks comprises determining a consolidation boundary corresponding to respective ones of the plurality of consolidation tracks.

10. The method of any clause herein, wherein the consolidation boundary comprises a melt pool boundary.

11. The method of any clause herein, wherein generating the simulated additively manufactured three-dimensional object comprises: determining a plurality of simulated consolidation layers respectively including at least some of the plurality of approximate consolidation domains.

12. The method of any clause herein, comprising: determining the plurality of approximate consolidation domains based at least in part on an irradiation parameter matrix, the irradiation parameter matrix comprising a plurality of nodes, respective ones of the plurality of nodes defining one or more irradiation parameter values utilized when forming a corresponding one or more consolidation tracks.

13. The method of any clause herein, wherein the plurality of approximate consolidation domains respectively comprise an approximate consolidation boundary, the approximate consolidation boundary representing a mean, a median, or a mode determined from the plurality of consolidation tracks with a statistical confidence level.

14. The method of any clause herein, wherein at least some of the plurality of approximate consolidation domains differ from one another in respect of at least one dimensional property in accordance with a probability distribution determined based at least in part on the plurality of consolidation tracks.

15. The method of any clause herein, comprising: determining a plurality of simulated consolidation artifacts in the simulated additively manufactured three-dimensional object based at least in part on one or more dimensional properties of the plurality of approximate consolidation domains.

16. The method of any clause herein, wherein the plurality of simulated consolidation artifacts comprises void elements and/or overlap elements.

17. The method of any clause herein, wherein the plurality of simulated consolidation artifacts comprises coarse grain structures, microcrystalline grain structures, nanocrystalline grain structures, amorphous regions, precipitates, crystalline dislocations, and/or twinning dislocations.

18. The method of any clause herein, wherein the plurality of simulated consolidation artifacts comprises unmelted powder particles, unsintered powder particles, or unbound binder particles.

19. The method of any clause herein, wherein the one or more dimensional properties comprises a geometric shape of at least some of the plurality of approximate consolidation domains, and/or wherein the one or more dimensional properties comprises a configuration and arrangement of at least some of the plurality of approximate consolidation domains.

20. The method of any clause herein, wherein the one or more dimensional properties comprises an algebraic property of at least some of the plurality of approximate consolidation domains.

21. The method of any clause herein, wherein the one or more dimensional properties comprises a geometric shape and/or one or more dimensional properties corresponding to the geometric shape.

22. The method of any clause herein, comprising: determining a plurality of simulated consolidation artifacts in the simulated additively manufactured three-dimensional object based at least in part on a probability of respective ones of at least some of the plurality of approximate consolidation domains having a given dimensional property.

23. The method of any clause herein, wherein the plurality of simulated consolidation artifacts comprises void elements.

24. The method of any clause herein, comprising: determining a probability distribution for the plurality of simulated consolidation artifacts in the simulated additively manufactured three-dimensional object.

25. The method of any clause herein, comprising: determining a plurality of simulated consolidation artifacts in the simulated additively manufactured three-dimensional object; and determining the predictive inference with respect to at least one of the one or more material properties of the three-dimensional object based at least in part on the plurality of simulated consolidation artifacts.

26. The method of any clause herein, wherein the one or more material properties comprises: porosity, void sizes, void area, void aspect ratio, void maximum size, density, elastic modulus, yield strength, ductility, hardness, surface finish, mass, fatigue limit, and/or creep.

27. The method of any clause herein, wherein the one or more material properties comprises: one or more grain structures and/or one or more crystalline structures.

28. The method of any clause herein, wherein the one or more grain structures and/or one or more crystalline structures comprises: a coarse grain region, a microcrystalline grain region, a nanocrystalline grain region, an amorphous region, precipitates, crystalline dislocations, and/or twinning dislocations.

29. The method of any clause herein, wherein the one or more material properties comprises unmelted powder particles, unsintered powder particles, and/or unbound binder particles.

30. The method of any clause herein, comprising: generating a CAD file and/or a build file for a three-dimensional object to be additively manufactured, the CAD file and/or the build file based at least in part on the simulated additively manufactured three-dimensional object and/or based at least in part on the predictive inference with respect to the one or more material properties of the three-dimensional object to be additively manufactured.

31. The method of any clause herein, comprising: additively manufacturing a three dimensional object based at least in part on the simulated additively manufactured three-dimensional object and/or based at least in part on the predictive inference with respect to the one or more material properties of the three-dimensional object to be additively manufactured.

32. A method of additively manufacturing a three-dimensional object, the method comprising: generating a simulated additively manufactured three-dimensional object based at least in part on a plurality of approximate consolidation domains, the plurality of approximate consolidation domains respectively corresponding to a plurality of consolidation tracks determined from one or more digital representations of an additively manufactured three-dimensional object; and additively manufacturing a three-dimensional object based at least in part on the simulated additively manufactured three-dimensional object.

33. The method of any clause herein, comprising: determining a predictive inference with respect to one or more material properties of the three-dimensional object to be additively manufactured based at least in part on the simulated additively manufactured three-dimensional object; additively manufacturing the three-dimensional object based at least in part on the predictive inference.

34. The method of any clause herein, comprising: generating a CAD file and/or a build file for the three-dimensional object to be additively manufactured, the CAD file and/or the build file based at least in part on the simulated additively manufactured three-dimensional object and/or based at least in part on one or more predictive inferences with respect to one or more material properties of the three-dimensional object to be additively manufactured; and additively manufacturing the three-dimensional object based at least in part on the CAD file and/or the build file.

35. A computer-readable medium comprising computer-executable instructions, which when executed by a processor, cause the processor to perform a method of designing an additively-manufactured three-dimensional object, the method comprising: generating a CAD file and/or a build file for a three-dimensional object to be additively manufactured, the CAD file and/or the build file based at least in part on a simulated additively manufactured three-dimensional object and/or based at least in part on one or more predictive inferences with respect to one or more material properties of the three-dimensional object to be additively manufactured; and additively manufacturing a three-dimensional object based at least in part on the CAD file and/or the build file.

36. The computer-readable medium of any clause herein, wherein additively manufacturing the three-dimensional object based at least in part on the CAD file and/or the build file comprises: additively manufacturing one or more test specimen of the three-dimensional object based at least in part on the CAD file and/or the build file.

37. The computer-readable medium of any clause herein, comprising: determining one or more material properties of the one or more test specimen and/or comparing the one or more material properties of the one or more test specimen to respective ones of the one or more predictive inferences with respect to the one or more material properties of the three-dimensional object.

38. The computer-readable medium of any clause herein, comprising: designating the CAD file and/or the build file as ready for manufacturing and/or providing the CAD file and/or the build file to an additive manufacturing machine when the one or more material properties of the one or more test specimen sufficiently match respective ones of the one or more predictive inferences.

39. The computer-readable medium of any clause herein, comprising: revising and/or updating an additive manufacturing simulation when the one or more material properties of the one or more test specimen do not sufficiently match respective ones of the one or more predictive inferences.

40. The computer-readable medium of any clause herein, wherein revising and/or updating an additive manufacturing simulation comprises: generating a simulated additively manufactured three-dimensional object based at least in part on a plurality of approximate consolidation domains, the plurality of approximate consolidation domains respectively corresponding to a plurality of consolidation tracks determined from one or more digital representations of an additively manufactured three-dimensional object; and determining an updated predictive inference with respect to at least some of the one or more material properties of the three-dimensional object to be additively manufactured based at least in part on the simulated additively manufactured three-dimensional object.

41. The computer-readable medium of any clause herein, comprising: generating a revised CAD file and/or a revised build file for the three-dimensional object to be additively manufactured, the revised CAD file and/or the revised build file based at least in part on the one or more material properties of the one or more test specimen and/or based at least in part on the comparing the one or more material properties of the one or more test specimen to respective ones of the one or more predictive inferences.

42. A computer-readable medium comprising computer-executable instructions, which when executed by a processor, cause the processor to perform a method of simulating additively manufacturing a three-dimensional object, the method comprising: generating a simulated additively manufactured three-dimensional object based at least in part on a plurality of approximate consolidation domains, the plurality of approximate consolidation domains respectively corresponding to a plurality of consolidation tracks determined from one or more digital representations of an additively manufactured three-dimensional object; and determining a predictive inference with respect to one or more material properties of a three-dimensional object to be additively manufactured based at least in part on the simulated additively manufactured three-dimensional object.

43. The computer-readable medium of any clause herein, configured to perform the method of any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method comprising:
    actuating an image sensor including a microscope to collect micrographic image data of a powder bed including melted or fused powder;
    collecting one or more irradiation parameters of an irradiation device that formed the melted or fused powder in the powder bed;
    identifying, from the micrographic image data, a plurality of consolidation tracks, each of the plurality of consolidation tracks corresponding to a region of the melted or fused powder in the powder bed;
    determining a plurality of approximate consolidation domains, each of the plurality of approximate consolidation domains corresponding to one or more of the plurality of consolidation tracks;
    determining a probability distribution of one or more dimensional properties of the plurality of approximate consolidation domains;
    generating a model of an additively manufactured three-dimensional object based at least in part on the probability distribution of the one or more dimensional properties of the plurality of approximate consolidation domains, the model including a probability distribution of one or more simulated consolidation artifacts, the probability distribution of the one or more simulated consolidation artifacts identified based on the probability distributions of the one or more dimensional properties of the plurality of approximate consolidation domains and the collected irradiation parameters; and
    determining a predictive inference with respect to one or more material properties of a three-dimensional object to be additively manufactured based on the generated model, the predictive inference based at least in part on the probability distribution of the one or more simulated consolidation artifacts in the generated model.

2. The method of claim 1, further comprising:
    determining the plurality of approximate consolidation domains based at least in part on a curve fitting algorithm and/or based at least in part on a data library that includes a plurality of geometric approximation candidates.

3. The method of claim 1, wherein the plurality of consolidation tracks correspond to a melt pool domain, a sintering domain, or a reaction domain.

4. The method of claim 1, wherein generating the model of the additively manufactured three-dimensional object comprises:
   determining a plurality of simulated consolidation layers respectively including at least some of the plurality of approximate consolidation domains.

5. The method of claim 1, further comprising:
   determining the plurality of approximate consolidation domains based at least in part on an irradiation parameter matrix, the irradiation parameter matrix comprising a plurality of nodes, respective ones of the plurality of nodes defining one or more irradiation parameter values utilized when forming a corresponding one or more of the plurality of consolidation tracks.

6. The method of claim 1, wherein at least some of the plurality of approximate consolidation domains differ from one another in respect of at least one of the one or more dimensional properties in accordance with a probability distribution determined based at least in part on the plurality of consolidation tracks.

7. The method of claim 1, wherein the plurality of simulated consolidation artifacts include void elements, overlap elements, or both;
   wherein the plurality of simulated consolidation artifacts include coarse grain structures, microcrystalline grain structures, nanocrystalline grain structures, amorphous regions, precipitates, crystalline dislocations, twinning dislocations, or combinations thereof;
   wherein the plurality of simulated consolidation artifacts include unmelted powder particles, unsintered powder particles, or unbound binder particles.

8. The method of claim 1, wherein the one or more material properties include: porosity, void sizes, void area, void aspect ratio, void maximum size, density, elastic modulus, yield strength, ductility, hardness, surface finish, mass, fatigue limit, or creep.

9. The method of claim 1, comprising:
   generating a CAD file or a build file for the three-dimensional object to be additively manufactured according to the generated model, the CAD file or the build file based at least in part on the generated model or based at least in part on the predictive inference with respect to the one or more material properties of the three-dimensional object to be additively manufactured according to the generated model.

10. The method of claim 1, comprising:
    additively manufacturing the three-dimensional object based at least in part on the generated model or based at least in part on the predictive inference with respect to the one or more material properties.

11. A method of additively manufacturing a three-dimensional object, the method comprising:
    actuating an image sensor including a microscope to collect micrographic image data of a powder bed including melted or fused powder;
    collecting one or more irradiation parameters of an irradiation device that formed the melted or fused powder in the powder bed;
    identifying, from the micrographic image data, a plurality of consolidation tracks, each of the plurality of consolidation tracks corresponding to a region of the melted or fused powder in the powder bed;
    determining a plurality of approximate consolidation domains, each of the plurality of approximate consolidation domains corresponding to one or more of the plurality of consolidation tracks;
    determining a probability distribution of one or more dimensional properties of the plurality of approximate consolidation domains;
    generating a model of an additively manufactured three-dimensional object based at least in part on the probability distribution of one or more dimensional properties of the plurality of approximate consolidation domains, the model including an identification, for each of a plurality of modeled points defining the additively manufactured three-dimensional object, of a presence of simulated consolidation artifact based on the probability distribution of one or more dimensional properties of the plurality of approximate consolidation domains and the collected irradiation parameters; and
    actuating the irradiation device to additively manufacture a three-dimensional object based at least in part on the generated model.

12. The method of claim 11, comprising:
    generating a CAD file or a build file for the three-dimensional object to be additively manufactured, the CAD file or the build file based at least in part on the simulated additively manufactured three-dimensional object and/or based at least in part on one or more predictive inferences with respect to one or more material properties of the three-dimensional object to be additively manufactured; and
    additively manufacturing the three-dimensional object based at least in part on the CAD file or the build file.

13. A system comprising a computer including a processor and a memory, the memory storing instructions executable by the processor to:
    actuate an image sensor including a microscope to collect micrographic image data of a powder bed including melted or fused powder;
    collect one or more irradiation parameters of an irradiation device that formed the melted or fused powder in the powder bed;
    identify, from the micrographic image data, a plurality of consolidation tracks, each of the plurality of consolidation tracks corresponding to a region of the melted or fused powder in the powder bed;
    determine a plurality of approximate consolidation domains of the melted or fused powder, each of the plurality of approximate consolidation domains corresponding to one or more of the plurality of consolidation tracks;
    determine a probability distribution of one or more dimensional properties of the plurality of approximate consolidation domains;
    generate a model of an additively manufactured three-dimensional object based on the the probability distribution of the one or more dimensional properties of the plurality of approximate consolidation domains;
    determine a predictive inference of one or more material properties of a three-dimensional object to be additively manufactured according to the generated model, the predictive inference based on the probability distribution of the one or more dimensional properties of the plurality of approximate consolidation domains and the collected irradiation parameters;
    generate a file including data and instructions to additively manufacture the three-dimensional object, the file based at least in part on the generated model or based at least in part on the predictive inference; and additively manufacture the three-dimensional object according to the data and the instructions in the file.

14. The system of claim 13, wherein the instructions further include instructions to additively manufacture one or more test specimens of the three-dimensional object based at least in part on the file.

15. The system of claim 13, wherein the instructions further include instructions to determine one or more material properties of the one or more test specimens or compare the one or more material properties of the one or more test specimens to a respective predictive inference of the one or more material properties of the three-dimensional object.

16. The system of claim 15, wherein the instructions further include instructions to designate the file as ready for manufacturing or to provide the file to an additive manufacturing machine when the determined one or more material properties of the one or more test specimens match the respective predictive inferences of the one or more material properties of the three-dimensional object.

* * * * *